United States Patent
Swildens et al.

(10) Patent No.: US 7,194,522 B1
(45) Date of Patent: *Mar. 20, 2007

(54) CONTENT DELIVERY AND GLOBAL TRAFFIC MANAGEMENT NETWORK SYSTEM

(75) Inventors: Eric Sven-Johan Swildens, Mountain View, CA (US); Richard David Day, Mountain View, CA (US); Ajit K. Gupta, Fremont, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/873,570

(22) Filed: Jun. 21, 2004

Related U.S. Application Data

(63) Continuation of application No. 09/909,651, filed on Jul. 19, 2001, now Pat. No. 6,754,699, which is a continuation-in-part of application No. 09/641,746, filed on Aug. 18, 2000, now Pat. No. 6,484,143.

(60) Provisional application No. 60/219,172, filed on Jul. 19, 2000, provisional application No. 60/219,166, filed on Jul. 19, 2000, provisional application No. 60/219,946, filed on Jul. 19, 2000, provisional application No. 60/219,177, filed on Jul. 19, 2000.

(51) Int. Cl.
*G06F 15/16* (2006.01)
*G06F 9/00* (2006.01)

(52) U.S. Cl. .................. 709/217; 370/229; 718/105

(58) Field of Classification Search ............. 709/203, 709/217, 219, 225; 370/229, 390; 711/163; 718/105
See application file for complete search history.

(56) References Cited

U.S. PATENT DOCUMENTS

| | | | |
|---|---|---|---|
| 6,167,438 A | 12/2000 | Yates et al. | |
| 6,185,598 B1 * | 2/2001 | Farber et al. | 709/200 |
| 6,185,601 B1 | 2/2001 | Wolff | |
| 6,330,605 B1 | 12/2001 | Christensen et al. | |
| 6,415,335 B1 | 7/2002 | Lowery et al. | |
| 6,502,125 B1 * | 12/2002 | Kenner et al. | 709/203 |
| 6,560,717 B1 | 5/2003 | Scott et al. | |
| 6,754,699 B2 * | 6/2004 | Swildens et al. | 709/217 |
| 2001/0049741 A1 | 12/2001 | Skene et al. | |

(Continued)

*Primary Examiner*—David Wiley
*Assistant Examiner*—George C. Neurauter, Jr.
(74) *Attorney, Agent, or Firm*—Kirk D. Wong; Hickman Palermo Truong & Becker LLP

(57) ABSTRACT

A content delivery and global traffic management network system provides a plurality of caching servers connected to a network. The caching servers host customer content that can be cached and stored, and respond to requests for Web content from clients. If the requested content does not exist in memory or on disk, it generates a request to an origin site to obtain the content. A DNS Server (SPD) load balances network requests among customer Web servers and directs client requests for hosted customer content to the appropriate caching server which is selected by choosing the caching server that is closest to the user, is available, and is the least loaded. SPD also supports persistence and returns the same IP addresses, for a given client. The entire Internet address space is broken up into multiple zones. Each zone is assigned to a group of SPD servers. If an SPD server gets a request from a client that is not in the zone assigned to that SPD server, it forwards the request to the SPD server assigned to that zone. Servers write information about the content delivered to log files that are picked up by a log server.

10 Claims, 18 Drawing Sheets

U.S. PATENT DOCUMENTS

| | | |
|---|---|---|
| 2002/0026511 A1 | 2/2002 | Garcia-Luna-Aceves et al. |
| 2002/0103846 A1 | 8/2002 | Zisapel et al. |
| 2002/0129134 A1 | 9/2002 | Leighton et al. |
| 2004/0133793 A1 | 7/2004 | Ginter et al. |

* cited by examiner

Cache Control Page

| This page shows the domains you have set up for content delivery and global traffic management. |  |
|---|---|
| Content Delivery ||
| Domain Name | Origin Domains |
| www.speedera.net | www.speedera.com |

Domains Page

By Location – World Map

By Location – Traffic

Location:server-14,dc,cw(204.71.35.146)

| URL | | | | | | | | | |
|---|---|---|---|---|---|---|---|---|---|
| IP Address | ERR | HRC | LEN | CHK | STT | DRT | COT | DST | FNT | END |

| www.speedera.com/ | | | | | | | | | | |
|---|---|---|---|---|---|---|---|---|---|---|
| 209.24.35.130 | 0 | 200 | 7586 | 632552 | 0 | 0 | 214 | 130 | 136 | 482 |

| www.speedera.net/www.speedera.com/images/background.gif | | | | | | | | | | |
|---|---|---|---|---|---|---|---|---|---|---|
| 204.71.35.135 | 0 | 200 | 87 | 8934 | 482 | 12 | 0 | 1 | 0 | 496 |

| www.speedera.net/www.speedera.com/images/barbend.gif | | | | | | | | | | |
|---|---|---|---|---|---|---|---|---|---|---|
| 204.71.35.134 | 0 | 200 | 3009 | 357219 | 494 | 1 | 1 | 1 | 0 | 498 |

Location Table

| Global Traffic Management |||
|---|---|---|
| Domain Name | Location | IP Addresses |
| customer.speedera.net | UUNET | a.b.c.d |
| | VSNL/delhi | w.x.y.z |

This page shows the domains you have set up for content delivery and global traffic management.

Domains Page

Traffic Management Recent Activity graph

Overall Time Table

| URL | | | | | | | | | |
|---|---|---|---|---|---|---|---|---|---|
| IP Address | ERR | HRC | LEN | CHK | STT | DRT | COT | DST | FNT | END |
| www.speedera.com/ | | | | | | | | | | |
| 209.24.35.130 | 0 | 200 | 7586 | 632552 | 0 | 0 | 214 | 130 | 136 | 482 |
| www.speedera.net/www.speedera.com/images/background.gif | | | | | | | | | | |
| 204.71.35.135 | 0 | 200 | 87 | 8934 | 482 | 12 | 0 | 1 | 0 | 496 |
| www.speedera.net/www.speedera.com/images/barbend.gif | | | | | | | | | | |
| 204.71.35.134 | 0 | 200 | 3009 | 357219 | 494 | 1 | 1 | 1 | 0 | 498 |

Location Table

CONTENT DELIVERY AND GLOBAL TRAFFIC MANAGEMENT NETWORK SYSTEM

CROSS-REFERENCES TO RELATED APPLICATIONS

The present application is a continuation of U.S. patent application Ser. No. 09/909,651 filed Jul. 19, 2001 (now U.S. Pat. No. 6,754,699 B2 issued on Jun. 22, 2004), which is incorporated by reference for all purposes and which is a continuation in-part of U.S. patent application Ser. No. 09/641,746 filed Aug. 18, 2000 (now U.S. Pat. No. 6,484,143 B1 issued on Nov. 19, 2002), and claims priority to Provisional U.S. Patent Application Nos. 60/219,172, 60/219,166, 60/219,946, and 60/219,177 all filed on Jul. 19, 2000, and U.S. patent application Ser. No. 09/644,927 filed Aug. 23, 2000 (now U.S. Pat. No. 6,405,252 B2 issued Jun. 11, 2002).

BACKGROUND OF THE INVENTION

1. Technical Field

The invention relates to world wide area networking in a computer environment. More particularly, the invention relates to delivering content and managing traffic across a world wide area network in a computer environment.

2. Description of the Prior Art

The Internet is a world wide "super-network" which connects together millions of individual computer networks and computers. The Internet is generally not a single entity. It is an extremely diffuse and complex system over where no single entity has complete authority or control. Although the Internet is widely know for one of its ways of presenting information through the World Wide Web (herein "Web"), there are many other services currently available based upon the general Internet protocols and infrastructure.

The Web is often easy to use for people inexperienced with computers. Information on the Web often is presented on "pages" of graphics and text that contain "links" to other pages either within the same set of data files (i.e., Web site) or within data files located on other computer networks. Users often access information on the Web using a "browser" program such as one made by Netscape Communications Corporation (now America Online, Inc.) of Mountain View, Calif. or Explorer™ from Microsoft Corporation of Redmond, Wash. Browser programs can process information from Web sites and display the information using graphics, text, sound, and animation. Accordingly, the Web has become a popular medium for advertising goods and services directly to consumers.

As time progressed, usage of the Internet has exploded. There are literally millions of users on the Internet. Usage of the Internet is increasing daily and will eventually be in the billions of users. As usage increases so does traffic on the Internet. Traffic generally refers to the transfer of information from a Web site at a server computer to a user at a client computer. The traffic generally travels through the world wide network of computers using a packetized communication protocol, such as TCP/IP. Tiny packets of information travel from the server computer through the network to the client computer. Like automobiles during "rush hour" on Highway 101 in Silicon Valley, the tiny packets of information traveling through the Internet become congested. Here, traffic jams which cause a delay in the information from the server to the client occur during high usage hours on the Internet. These traffic jams lead to long wait times at the client location. Here, a user of the client computer may wait for a long time for a graphical object to load onto his/her computer.

From the above, it is seen that an improved way to transfer information over a network is highly desirable.

It would be advantageous to provide content delivery and global traffic management network system that allows network traffic to be efficiently distributed to content servers by load balancing requests among servers and providing cached content for faster response times. It would further be advantageous to provide a content delivery and global traffic management network system that allows system administrators to collect traffic and server information.

SUMMARY OF THE INVENTION

The invention provides a content delivery and global traffic management network system. The system provides efficiently distributed network traffic to content servers by load balancing requests among servers and provides cached content for faster response times. In addition, the invention provides traffic and server information gathering for up to date system status.

An embodiment of the invention provides a plurality of caching servers connected to a network. The caching servers host customer content that can be cached and stored, e.g., images, video, text, and/or software. The caching servers respond to requests for Web content from clients (Web browsers). If the requested content does not exist in memory or on disk, it generates a request to an origin site to obtain the content.

A Speedera DNS Server (SPD) load balances network requests among customer Web servers and directs client requests for hosted customer content to the appropriate caching server. The appropriate caching server is selected by choosing the caching server that is closest to the user, is available, and is the least loaded.

SPD also supports persistence. For persistent hostnames, SPD returns the same IP addresses, for a given client. The SPD server maintains a table containing the IP address given out for a given hostname to a client. This table is created dynamically in response to incoming requests and is synchronized across all the SPD servers responsible for a given zone. If the same client tries to resolve the hostname against a different SPD server in the future, it will get the same result.

To reduce the memory requirements and network traffic, the entire Internet address space is broken up into multiple zones. Each zone is assigned to a group of SPD servers. If an SPD server gets a request from a client that is not in the zone assigned to that SPD server, it forwards the request to the SPD server assigned to that zone. The SPD servers need to keep latency and persistence information only for the clients that fall in the zone assigned to the server. The latency probes only send the client latency information back to the SPD servers responsible for that client. Also the SPD servers only need to synchronize the persistence table with the SPD servers responsible for that zone, not all the SPD servers in the network.

When SPD has to forward the DNS request to servers in another zone, it selects the server with the best (lowest) latency value. This allows the SPD server to dynamically load balance between the SPD servers in the same zone and avoid servers that may be down or are having some other problems.

SPD supports a two-tier architecture that can be used to increase the number of DNS servers in the system to more than the maximum allowed for .com domains. It can also be used to direct the client DNS servers to the closest Speedera DNS servers and to prevent the client DNS server from flip-flopping between all the DNS servers authoritative for speedera.net domain.

A customer either delegates a DNS name to said DNS server using a CNAME or by directly delegating the domain or is assigned a host domain name that some portion of the customer's Web site is associated with. When the host server for the assigned host domain name gets a hit for content it does not contain, it will hit the appropriate content on the customer's Web site to pick up and store that content, otherwise, the host server fulfills the hit from its cache.

The caching servers make requests back to the origin customer server site at specified intervals to check to see if the content that the caching server has cached is fresh. Caching servers also look at expiry headers in the HTTP content it retrieves from the origin customer server site to ensure freshness.

A configuration file contains all the static information about the Speedera Network. It contains the list of POPS and the servers present at each POP. It also contains the list of hostnames serviced by the network and maps the hostnames to the servers that can serve the content for that hostname. Every server in the network that needs configuration information has a copy of the appropriate current configuration file. The configuration file that a server receives contains all the configuration information for the particular portion of the network that the server is responsible for. A system administrator can, at any time, push a new configuration file to all machines that need it.

The caching servers write information about the content delivered to log files that are picked up and maintained by the log server. At a regular fixed interval, the caching server compresses and sends the logs of the content delivered to the log analysis servers. The log server collects the log files and delivers them to a database server that extracts and correlates the information. The information is used for billing as well as by customers for log analysis.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a content delivery and global traffic management network system in a computer environment. A system according to the invention provides efficiently distributed network traffic to content servers by load balancing requests among servers and provides cached content for faster response times. In addition, the invention provides traffic and server information gathering for up to date system status.

A technique including a user interface device and system for global traffic management and content distribution is provided. In an exemplary embodiment, the method is applied to a world wide network of computers, such as the Internet or an internet.

In a specific embodiment, the invention provides a user interface device and system for providing a shared GTM and CDN (collectively Universal Distribution Network) for a service fee, where the customer or user does not need to purchase significant hardware and/or software features. The present interface device and system allows a customer to scale up its Web site, without a need for expensive and difficult to use hardware and/or software. In a preferred embodiment, the customer merely pays for a service fee, which can be fixed, variable, lump sum, or based upon a subscription model using the present system. The present device and system are preferably implemented on a system including a novel combination of global traffic management and content distribution.

Figure 1:
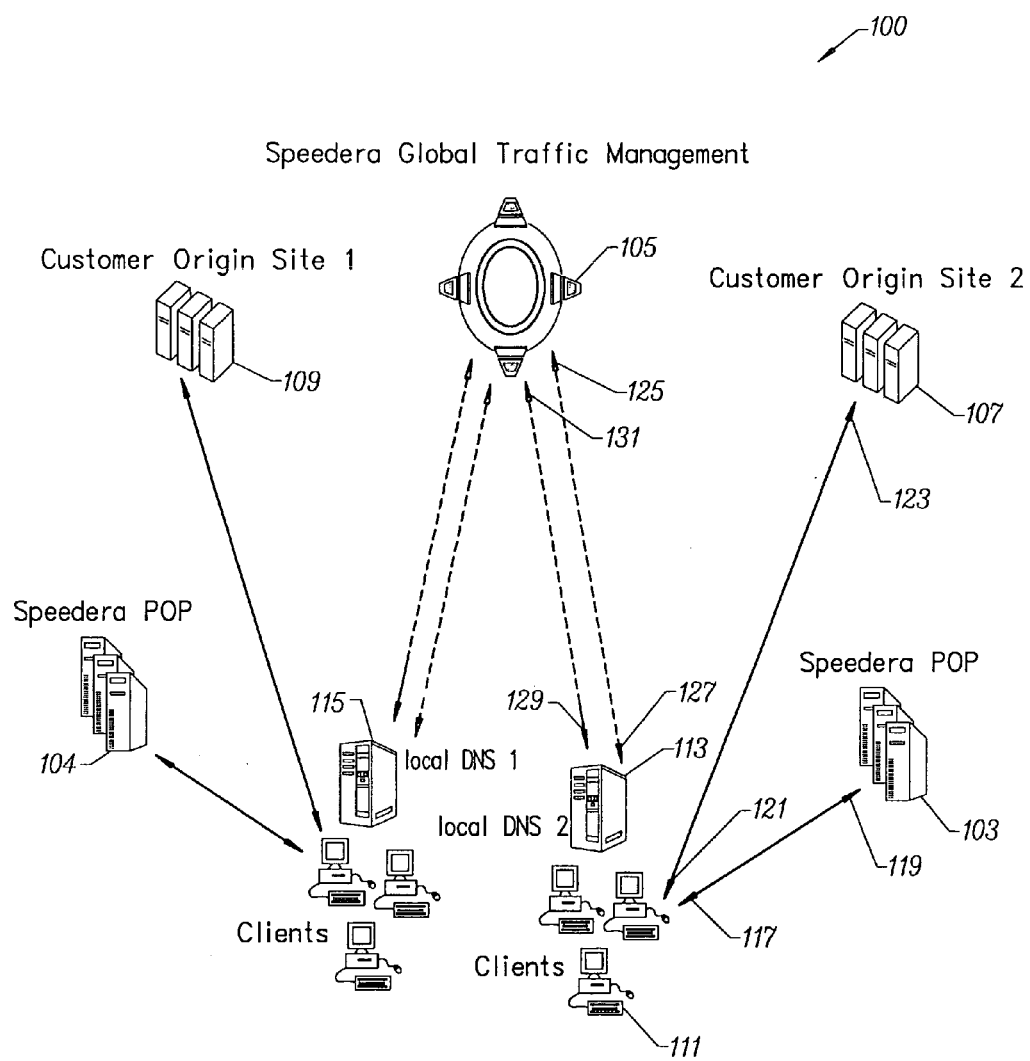
FIG. 1 is a simplified diagram of a system according to an embodiment of the present invention.

An overall system diagram 100 is illustrated in FIG. 1. The diagram is merely an example, which should not unduly limit the scope of the claims herein. One of ordinary skill in the art would recognize many other variations, modifications, and alternatives. As shown, the system 100 includes a variety of features to defined the Universal Delivery Network (UDN). The UDN has a combined content delivery network 103 and 104 and a global traffic management network 105, which are coupled to each other. This eliminates the need for independent CDN and GTM solutions. The UDN can be implemented as a single outsourced solution or service to a customer. When deployed across the WAN, it creates a unified network that provides a universal solution for content routing and high availability delivery.

Customers can leverage the size, scope, and location of the UDN to store content such as HTML, images, video, sound and software for fast and highly available access by clients. The network can also incorporate customer origin sites 107, 109 that will then benefit from shared load balancing and traffic management. Customers with generated content, such as search engines, auctions and shopping carts, can use the latter feature to add their own content servers to the network. In some embodiments, the system typically requires no software or hardware to be installed or run at a customer site. A Web interface is available for display of the network's current status as well as historical statistics on a per customer basis.

The system functions by mapping hostnames, such as www.customer.com to a customers origin servers 107 and 109. The local DNS 113 queries the traffic management system 105 for name resolution of the customers Web site and receives a response specifying the server best suited to handle the request, either customer origin servers 107 or servers 103 located in the UDN. When the client 111 requests a customer homepage, tags within the HTML direct the imbedded static content to the network of cache servers 103 and 104. In this example the static content may be tagged with a domain name like customer.speedera.com. Each local DNS in the example is directed to a different resource for each hostname based on several factors, such as proximity to the resource, network congestion, and server load.

In this example, www.customer.com is mapped to the customer origin servers represented by customer origin Sites 1 109 and 2 107. Customer.speedera.net is mapped to a collection of delivery nodes represented by point of presence servers, i.e., POPs 103, 104. As merely an example, a method for using such a UDN is provided below.

1. The client 111 requests a customer home page: www.customer.com from a local DNS 113.

2. The local DNS 113 queries the traffic management system 105 for name and address resolution and receives a reply 125, 127 indicating the optimal customer origin site to retrieve the homepage 131. In this step, the traffic management system still looks at many if not all factors; network health, server health, packet loss, cost, etc. to determine the optimal customer origin site.

3. The client connects to the site and retrieves the home page (solid blue line) 123, 121.

4. An object with the image tag specifying http://customer.speedera.net/www.customer.com/hello.gif is found in the HTML of the homepage.

5. The local DNS queries the traffic management system for name and address resolution.

6. The traffic management system looks 129, 131 at factors such as network performance and server load and returns the address of the POP best suited to serve the requested content.

7. The client then retrieves the content from the specified delivery node 117, 119.

This sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. Details of each of the features noted above are more fully described below.

The DNS server (DNS) can be thought of as the traffic director of the system. It contains a mapping of where resources (grouped by hostnames) have been allocated as well as the current state of each resource and their availability to each client. It receives the static information (the mappings) from the configuration file and the dynamic information (resource availability) from the probes. The configuration file also instructs the DNS server how to weight the various criteria available when making its decisions. The DNS is a fully functional DNS server and is compatible with current versions of BIND. Decision criteria cover such areas as resource availability, resource load, latency, static mapping configuration, persistence requirements, fail over logic, weighting parameters, and others, each of which can be alone or combined.

Multiple DNS servers are deployed to provide high availability. The DNS servers are spread throughout the network to avoid single points of failure. The DNS server was designed from the beginning with the ability to proxy requests. This proxy ability combined with algorithms to divide client latency and persistence information across a group of DNS servers greatly reduces the problems associated with WAN replication and synchronization. In the event a request arrives at a DNS server that is not authoritative for this client, the DNS can proxy the request to any number of servers to find an authoritative answer.

The DNS server logs both request and operational data to the database for subsequent viewing. Both real-time and historical views are available. The request data allows the administrator and customer to see to the number of requests directed to each POP on a per hostname basis. The operational data provides statistics about the DNS server and would typically only be viewed by the administrator.

The present system also uses one or more probes to detect information about certain criteria from the network. There are probes including a NetProbes, a ServiceProbe and a LatencyProbe. ServiceProbes test local server resources while LatencyProbes conduct network round trip tests to clients. Each POP in the network is assigned a ServiceProbe and a LatencyProbe—these can be separate machines but in most cases, the same machine will perform both types of probe.

Figure 2:
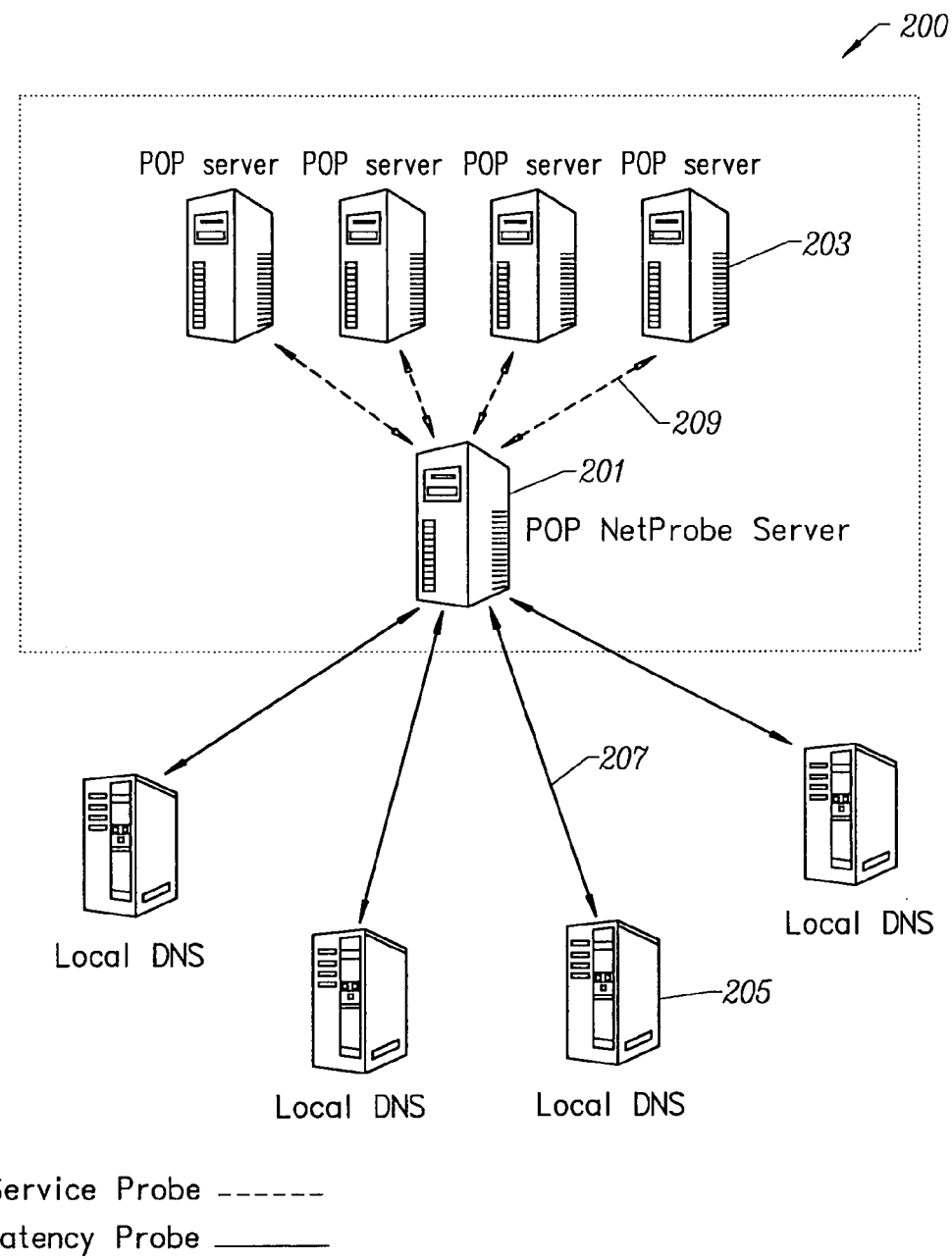
FIG. 2 is a more detailed diagram of probes used in the system according to an embodiment of the present invention.

The NetProbes are responsible for providing the traffic management system with service and latency metrics. The metrics are reported to the DNS server and LogServers. FIG. 2 is a simplified diagram 200 of these probes according to embodiments of the present invention. This diagram is merely an example which should not limit the scope of the claims herein. One of ordinary skill in the art would recognize many variations, alternatives, and modifications. The diagram 200 includes a POP 201, which includes a NetProbes server. Service probes monitor the POP servers to test the availability and load of the services they support. The latency probe tests the round trip time between the POP and the DNS servers.

A ServiceProbe determines service metric information for servers in the UDN and reports them to the DNS server. Service metrics are one of the decision criteria used by the DNS to make its routing determinations. Each server in the UDN supports one or more services—a Web server provides HTTP service, a FTP server provides FTP service. The service probe uses various approaches for gathering data—a service test and statistical monitoring. The value of a service metric is dependent on the metric type and its implementation.

The HTTP service is an example of the service test approach. Rather then try to test the individual characteristics of a server that may have an impact on performance, the service itself is evaluated as a user would experience it, in order to determine its response time and validity. LOADP, a process running on each server, is implemented as a statistical monitor and is used as a generic service for testing purposes. LOADP provides direct measurement of many system parameters including CPU load, memory usage, swap and disk status, and is used in load balancing decisions.

Hostnames in the system are mapped to service types. This allows a given server to support multiple services and be evaluated independently for each of them. When a request for a particular hostname arrives at a DNS, the service associated with that hostname is compared on each of the machines to find the best-suited server. The data from the probes are sent to both the DNS as well as the database. By sending the data to the database, it allows the performance of the network to be viewed in real time as well as over a period of time.

Every server in the UDN is housed in a POP and each POP has a Latency Probe assigned to it, as shown. The Latency Probes determine the latency from their location to other locations on the Internet (specifically to client DNS' requesting name resolution). The DNS' use this information in determining the best-suited server for a particular request. The list of locations that are used in order to determine the latency is driven by the DNS. When it is determined by a DNS server that its current information regarding latency between "x" number of POPs and a client's local DNS has become stale, it will instruct the probe for that particular POP to recalculate the latency.

The probes utilize a collection of methods to determine the latency based on cost. The probe uses the least expensive method first and moves on to more expensive methods if no results are determined. The probe is designed so new methods can be plugged in as they are developed. The methods can be either active or passive and are prioritized based on accuracy. Active methods may take the form of ping or traceroute but are typically more sophisticated. Passive methods could reference local BGP tables to determine cost metrics.

The individual latency data is sent to the DNS servers while operational data of each method, their success rates, etc are sent to the database. This allows the current and new methods to be monitored and managed. LatencyProbes perform latency tests to the local client DNS (LDNS). The LatencyProbes build a table of LDNS' to test over time, receiving the list of which DNS client IP addresses to probe from the DNS Servers in the network.

Figure 3:
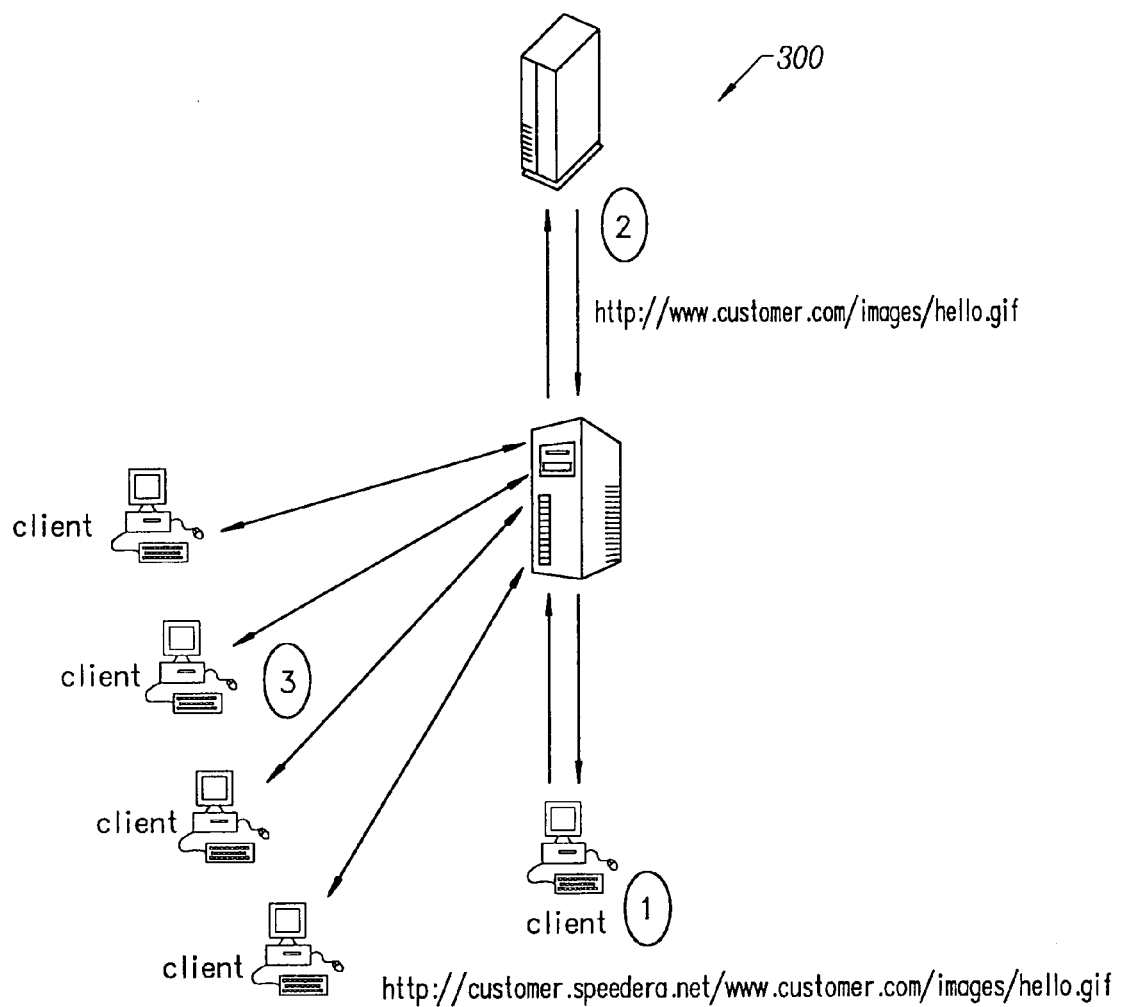
FIG. 3 is a more detailed diagram of a caching sequence used in the system according to an embodiment of the present invention.

In a specific embodiment, the delivery nodes are the edge delivery servers of the network. The invention can support any types of IP based delivery servers including but not limited to HTTP, SSL, FTP, Streaming, NNTP, and DNS servers. In preferred embodiments, the invention uses an HTTP server and SSL cache server. The HTTP and SSL servers are identical with the exception of the encryption used on the data to and from the SSL cache in some embodiments. These servers have a proxy component that allows them to fill their cache by making requests to an origin site if a requested object is not in the cache. A method according to the invention can be briefly described as follows in reference to the simplified diagram 300 of FIG. 3:

1. An initial user makes a request to the cache for an object http://customer.speedera.net/www.cutomer.com/images/test.gif (Step 1);

2. The cache, discovering that it does not have the object, will find the name of the origin site in the URL (www.customer.com) and make a request to the origin site for /images/test.gif (Step 2);

3. When the cache receives the object it is saved on disk and memory and returned to the initial user. Subsequent users who make requests for the same object will be satisfied by the cache directly (Step 3).

This sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives.

Other protocols will work in a similar fashion unless there is a time concern with loading the first request. An example of this is a live streaming event or large file downloads (patches or video on demand). In these cases the caches may be pre-filled with the data that they need to serve. This pre-filling may take place over terrestrial lines or via satellite in some cases. Statistics about data delivered from the delivery nodes are reported through the logging system to the database for subsequent viewing and analysis.

The system also has a user interface. Here, engineering staff as well as customers can login to monitor and administer the network access from nearly any Internet connected Web browser (with proper authentication). The user interface includes tables and graphs from the database. Data arrives at the user interface through the Logging System. This system has two parts: Log Distributor daemons and Log Collector daemons. This daemon monitors a defined directory for completed log files. Log files are defined as complete when they reach a defined size or age. A logging API which all resources share controls the definitions of size and age. When the Log Distributor finds completed log files it is able to send them back to one of many Log Collector daemons for insertion in the database.

As noted, the present network has many advantages. The network has as comprehensive, extensible, multi-faceted global traffic management system as its core, which is coupled to a content delivery network. Further details of the present content delivery network and global traffic management device are provided below. According to the present invention, a method for providing service to customers is provided. Details of such service are provided below.

Figure 4:
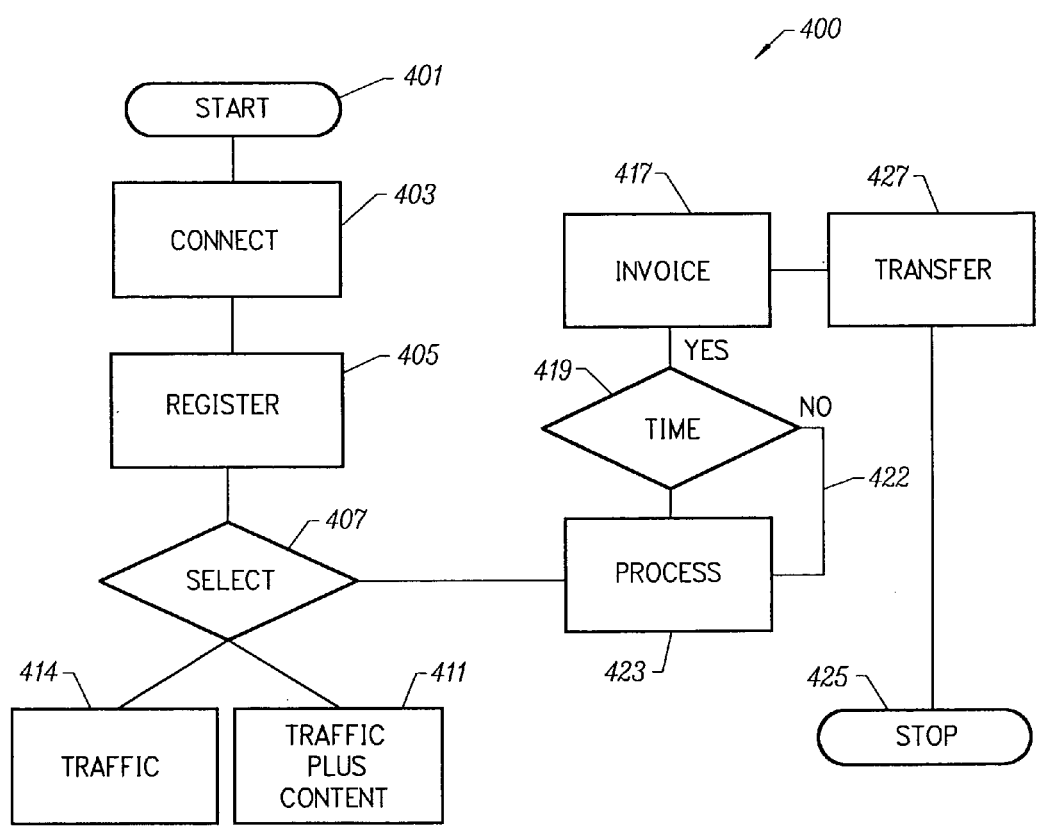
FIG. 4 is a simplified flow diagrams of methods according to embodiments of the present invention.

FIG. 4 is a simplified flow diagram of a novel service method 400 according to an embodiment of the present invention. The diagram is merely an example, which should not unduly limit the scope of the claims herein. One of ordinary skill in the art would recognize many other variations, modifications, and alternatives. As shown, the method begins at start, step 401. The method connects (step 403) a client to a server location through a world wide network of computers. The world wide network of computers can include an internet, the Internet, and others. The connection occurs via a common protocol such as TCP/IP. The client location is coupled to a server, which is for a specific user. The user can be any Web site or the like that distributes content over the network. As merely an example, the user can be a portal such as Yahoo! Inc. Alternatively, the user can be an electronic commerce site such as Amazon.com and others. Further, the user can be a health site. Information sites include the U.S. Patent Office Web site, educational sites, financial sites, adult entertainment sites, service sites, business to business commerce sites, etc. There are many other types of users that desire to have content distributed in an efficient manner.

In a specific embodiment, the user registers its site on the server, which is coupled to a content distribution server coupled to a global traffic management server. The user registers to select (step 407) a service from the server. The service can be either a traffic management service (step 414) or a traffic management service and content distribution service (step 411). Depending upon the embodiment, the user can select either one and does not need to purchase the capital equipment required for either service. Here, the user merely registers for the service and pays a service fee. The service fee can be based upon a periodic time frequency or other parameter, such as performance, etc. Once the service has been requested, the user performs some of the steps noted herein to use the service.

Next, the method processes (step 423) the user's request and allows the user to use the content distribution network and/or global traffic management network, where the user's Web pages are archives and distributed through the content distribution network in the manner indicated herein. The user's Web site should become more efficient from the use of such networks. Once a periodic time frequency or other frequency has lapsed (step 419), the method goes to an invoicing step, step 417. The invoicing step sends (step 427) an invoice to the user. Alternatively, the process continues until the periodic time frequency for the designated service lapses via line 422. The invoice can be sent via U.S. mail, electronic mail, or the like. The method stops, step 425. Alternatively, the invoicing step can deduct monetary consideration through an electronic card, e.g., debit card, credit card.

This sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

Figure 4A:
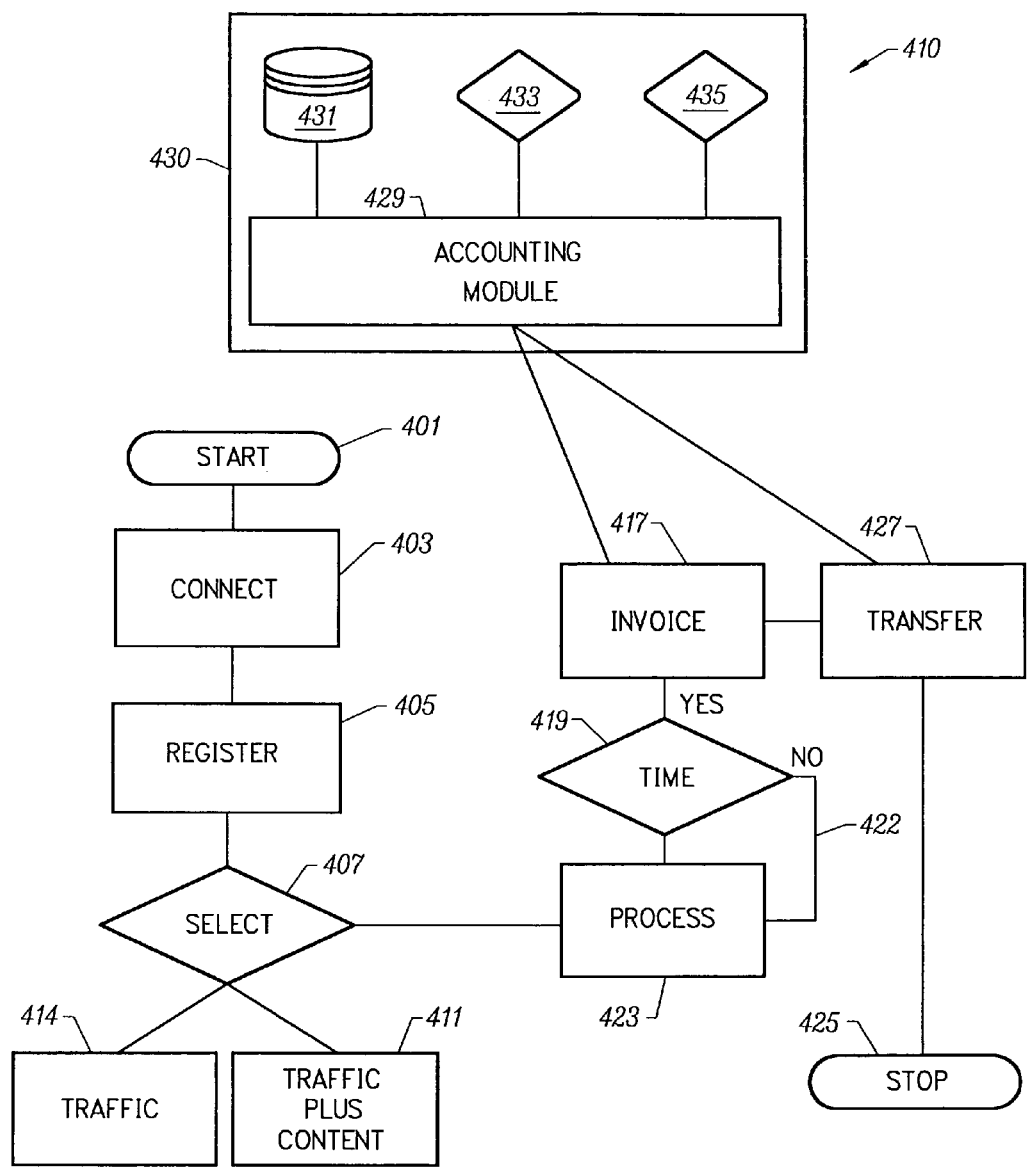
FIG. 4A is a simplified system diagram according to an embodiment of the present invention.

FIG. 4A is a simplified diagram of a computing system 430 according to an embodiment of the present invention. This diagram is merely an example which should not unduly limit the scope of the claims herein. One of ordinary skill in the art would recognize many other variations, modifications, and alternatives. Like reference numerals are used in this Fig., as the previous Fig. for cross-referencing purposes only. As shown, the computing system 430 carries out certain functionality that is integrated into the method above as well as others. The computing system includes an accounting module 429, which carries out certain accounting functions. The accounting module interfaces with mass memory storage 431, a microprocessing device 433, and a network interface device 435, which couples to local and/or wide area networks. The module oversees an invoicing step 417 and transfer step 427, as shown. Here, the accounting module is a task master for the service based method for using the content delivery network and/or global traffic management network.

Before discussing the accounting module in detail, we begin an overall method at start, step 401. The method connects (step 403) a client to a server location through a world wide network of computers. The world wide network of computers can include an internet, the Internet, and others. The connection occurs via a common protocol such as TCP/IP. The client location is coupled to a server, which is for a specific user. The user can be any Web site or the like that distributes content over the network. As merely an example, the user can be a portal such as Yahoo! Inc. Alternatively, the user can be an electronic commerce site such as Amazon.com and others. Further, the user can be a health site. Information sites include the U.S. Patent Office Web site, educational sites, financial sites, adult entertainment sites, service sites, business to business commerce sites, etc. There are many other types of users that desire to have content distributed in an efficient manner.

In a specific embodiment, the user registers its site on the server, which is coupled to a content distribution server coupled to a global traffic management server. The user registers to select (step 407) a service from the server. The service can be either a traffic management service (step 414) or a traffic management service and content distribution service (step 411). Depending upon the embodiment, the user can select either one and does not need to purchase the capital equipment required for either service. Here, the user merely registers for the service and pays a service fee. The service fee can be based upon a periodic time frequency or other parameter, such as performance, etc. Additionally, the user enters information such as the user's domain name, physical address, contact name, billing and invoicing instructions, and the like. Once the service has been requested, the user performs some of the steps noted herein to use the service.

Next, the method processes (step 423) the user's request and allows the user to use the content distribution network and/or global traffic management network, where the user's Web pages are archives and distributed through the content distribution network in the manner indicated herein. The user's Web site should become more efficient from the use of such networks. Once a periodic time frequency or other frequency has lapsed (step 419), the method goes to an invoicing step, step 417. Here, the method accesses the accounting module, which can retrieve registration information about the user, service terms, invoices, accounts receivables, and other information, but is not limited to this information. The accounting module determines the service terms for the user, which has already registered. Once the service terms have been uncovered from memory, the module determines the way the user would like its invoice. The accounting module directs an invoicing step, which sends (step 427) an invoice to the user. Alternatively, the process continues until the periodic time frequency for the designated service lapses via line 422. The invoice can be sent via U.S. mail, electronic mail, or the like. The method stops, step 425. Alternatively, the invoicing step can deduct monetary consideration through an electronic card, e.g., debit card, credit card. To finalize the transaction, an electronic mail message can be sent to the user, which is logged in memory of the accounting module.

This sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

EXAMPLE

To prove the principle and operation of the present invention, we have provided examples of a user's experience using the present invention. These examples are merely for illustration and should not unduly limit the scope of the claims herein. One of ordinary skill in the art would recognize many other variations, modifications, and alternatives. For easy reading, we have provided a description for a user's experience of a content delivery network and a user's experience of a global traffic management service, which is coupled to such content delivery network.

Content Delivery Network

1. Overview

In a specific embodiment, the invention provides a content distribution network. The following description contains information on how to use a graphical user interface to monitor activity, control cache, and perform checks. In some embodiments, the invention also provides a way for customer feedback to improve the service.

The present network is substantially always available in preferred embodiments. The network includes a Network Operations Center (NOC), which is dedicated to maintaining the highest possible network availability and performance. In most cases, the network is supported and staffed by specially trained service engineers, the 24-hour, 7 day NOC provides consultation, troubleshooting, and solutions for every issue. The staff can be reached through telephone, email, fax, or online. The staff generally connects you to engineers and solutions, not to answering machines.

In a specific embodiment, the network service can be used as long as the user has certain desires. For example, the user has content that needs to be delivered to end-users. This content can be delivered through HTTP, HTTPS, Streaming Media, or FTP, and the like. The server is for hosting the content on the Internet. For standard Web content, we implemented a caching system to distribute Web content from an origin server to a cache server that is close to a user. This means an origin server needs to exist that contains a master copy of the content. If the user has an existing Web site, the existing Web site will be the origin site.

In one embodiment, the present network is comprised of clusters of servers at points of presence located on many different backbone networks around the world. The servers provide global traffic management and distribution services for content of many kinds, including support for HTTP, HTTPS, FTP, and multiple varieties of streaming media.

In a specific embodiment, the present network includes one or more services. Here, the network may offer services, including:

1. Global Traffic Management—Provides global load balancing across multiple origin sites, along with intelligent failover and other advanced capabilities such as persistence and static mapping.

2. Content Delivery Network (CDN)—Supports content distribution and delivery for HTTP, HTTPS and FTP.

3. Streaming—Supports distribution and delivery of streaming media in many formats, such as Real Media, Windows Media, QuickTime and others.

The present CDN service has some advantages. For example, the CDN service helps increase the performance of any conventional Web site or other Internet services. It also helps reduce latency problems and packet loss, and it provides for content synchronization and replication. The network also reduces latency problems and packet loss. Latency problems result when the user's request travels beyond a certain distance or makes a number of network hops. When users request content from the Web or FTP sites, the requests are routed through the Internet to the server. If, as is true for many companies, the servers are located at only one site or a small number of sites, they will not be close to most of the users. Therefore, the users' request for content might traverse many networks to communicate with the desired servers.

Latency problems are often aggravated by packet loss. Packet loss, common on the Internet, tends to worsen at "peering points," locations where different networks connect. One way to reduce packet loss and latency is to install content servers closer to users and ensure that when a user requests data, the request is routed to the closest available server. The present network has deployed Web caches, streaming, and FTP servers throughout the Internet, on many networks close to end users. In addition, the network uses a Global Traffic Manager that routes traffic to the closest, most available and least loaded server.

The network often synchronizes the content on the customer's origin site with the Web cache servers on the network. When new content is placed on an origin site and when users make requests for that content, it is automatically replicated to Web cache servers in the network. When new content is published on the origin site with a new name, it is generally immediately available from all caches in the present network. For example, the network user might add an object to the site where a similar object exists:

Add "www.customer.com/images/picture2.jpg" to the same site as "www.customer.com/images/picture.jpg."

When a request for "picture2.jpg" arrives at a cache the first time, the cache in the network determines that it does not have a copy of "picture2.jpg, and the cache will request a copy from the origin site. To keep in synchronization with the origin site, the caches periodically check the content they have cached against the copy of the content in the origin site. For Web content, this is accomplished by periodically performing an "If-modified-since" request back to the origin site to see if the content has changed. This causes content changed on the origin site to be refreshed on the caches at a predefined interval. This interval can be configured depending upon ones needs.

The periodic checking is a common feature of caches but if a piece of content is updated, the old content may be invalidated and the new content published to all the caches in the network. The present CDN service makes this purging possible with a cache control utility that allows you to invalidate a single object, a content directory, or an entire site contained in the caches. In a specific embodiment, cache control is available as part of the service—a service provided to all customers. The present service method provides a comprehensive set of monitoring and administration capabilities for management of the Web site.

In a specific embodiment, the present service method runs on a secure server on the Internet and can be accessed only through a Web browser that supports secure connections (SSL). A username and password are often assigned to a user or customer when signed up for the service.

One of ordinary skill in the art would recognize many other variations, modifications, and alternatives. The above example is merely an illustration, which should not unduly limit the scope of the claims herein. It is also understood that the examples and embodiments described herein are for illustrative purposes only and that various modifications or changes in light thereof will be suggested to persons skilled in the art and are to be included within the spirit and purview of this application and scope of the appended claims.

2. Procedures

We now describe the procedures that can perform to set up the present CDN service and to monitor the performance of the Web site:

A. Implementing the CDN;

B. Invalidating content by controlling cache;

C. Monitoring activity; and

D. Performing tests.

Details of each of these procedures are provided below.

A. Implementing the CDN

To implement the CDN, the customer only need to make minor changes to the Web pages in order to direct user requests to the present Web caches instead of to the origin site. In a specific embodiment, the method is as simple as changing the pointers in the HTML. When a cache gets a request for content, it will return the requested object if it exists in the cache. If the content does not exist, it will retrieve the content from the origin site and return it to the user, as well as cache the content so that subsequent requests for that object are instantly available.

To modify the site, the customer can either: (1) changing the URL; or (2) set up virtual hosting. In a specific embodiment, the site can be modified for redirecting a user requests by changing the URL in the HTML. The following example, a request for a picture, shows the original html and the revised html.

Original homepage

The original homepage contains the following URL:

http://www.customer.com/page.html

The URL contains the following HTML:

<html><body>

Here is a picture:

<img src="images/picture jpg">

</body></html>

Revised homepage

The "img src" tag has been revised:

<html><body>

Here is a picture:

<img
    src="http://customer.speedera.net/www.customer.com/images/picture.jpg"></body></html>

With the original configuration, a user's browser requests the picture from the customer.com Web servers:
    page.html from www.customer.com
    images/picture.jpg from www.customer.com With the revised configuration, a user's browser requests the picture from the customer.speedera.net Web servers:
    page.html from www.customer.com
    www.customer.com/images/picture.jpg from customer.speedera.net Note: If the cache does not hold the requested object in memory or on disk, it makes a request to the origin site and caches it.

In an alternative embodiment, the method can set up virtual hosting so that the user's request for content is directed to the present CDN instead of to the origin site. Here, the customer can change the DNS setup to cause the domain name to resolve to the present network cache servers instead of to the original Web server. The domain name may be changed, for example, change the domain name from www.customer.com to wwx.customer.com. The present caches in the network can be configured in a way such that when they get a request for www.customer.com content they have not cached, they can make a request to the wwx.customer.com origin site to get the content. Here, the URLs in the Web pages may not need to be changed.

B. Invalidating Content by Controlling Cache

To invalidate the content contained in the caches, do the following:

1. Access the user interface at:

https://speedeye.speedera.com

2. Find the Cache Control page (see FIG. 5A) in the Content Delivery section of the interface.

3. Enter the URL in the text field.

4. Click Submit.

For example, if an image:

www.customer.com/images/picture.jpg and the user changed the image without changing the name and the user wanted the change to be immediately reflected in all caches in the network, the user could use the present service to invalidate the old content, as follows:

Enter "http://www.customer.com/images/picture.jpg" to invalidate the individual picture, or "http://www.customer.com/images/" to invalidate all content in the images directory, or "http://www.customer.com" to invalidate all content in the domain.

Note: Invalidating any of the above causes the change to "picture.jpg" to immediately be reflected in all the caches.

C. Monitoring Activity

Figures 5A, 5B:
FIGS. 5A to 5H are simplified diagrams of content delivery network according to an embodiment of the present invention.

In a specific embodiment, the present method allows the user to monitor the operation of the Content Delivery Network service. The present method shows how much content is being delivered and where it is being delivered. The start section of the user interface contains a table that shows the present domains and associated origin domains your account is set up to use, as shown in FIG. 5B.

Figure 5C:
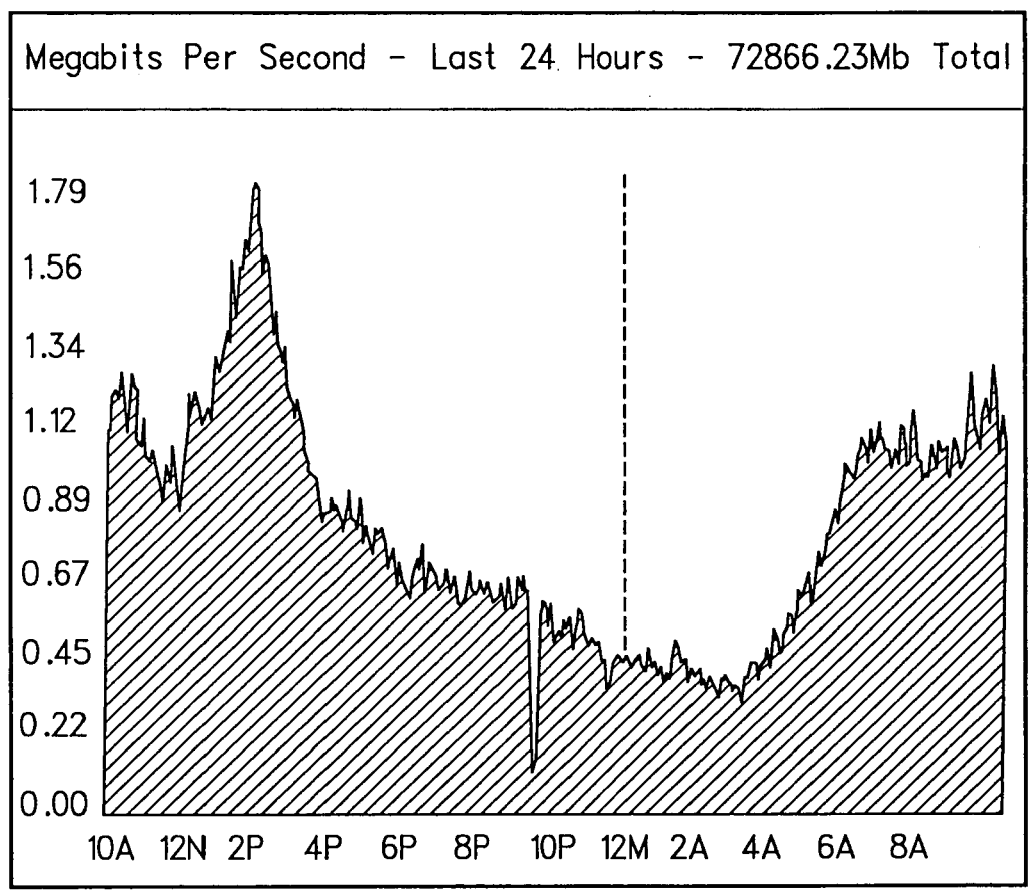

In a specific embodiment, the method includes monitoring recent activity, as shown in FIG. 5C. Here, the user can view the current and last 24 hours of content delivery traffic for a given domain:

1) Access the user interface at:

https://speedeye.speedera.com

2) Find the Recent Activity page in the Content Delivery section of the interface.

Figure 5D:
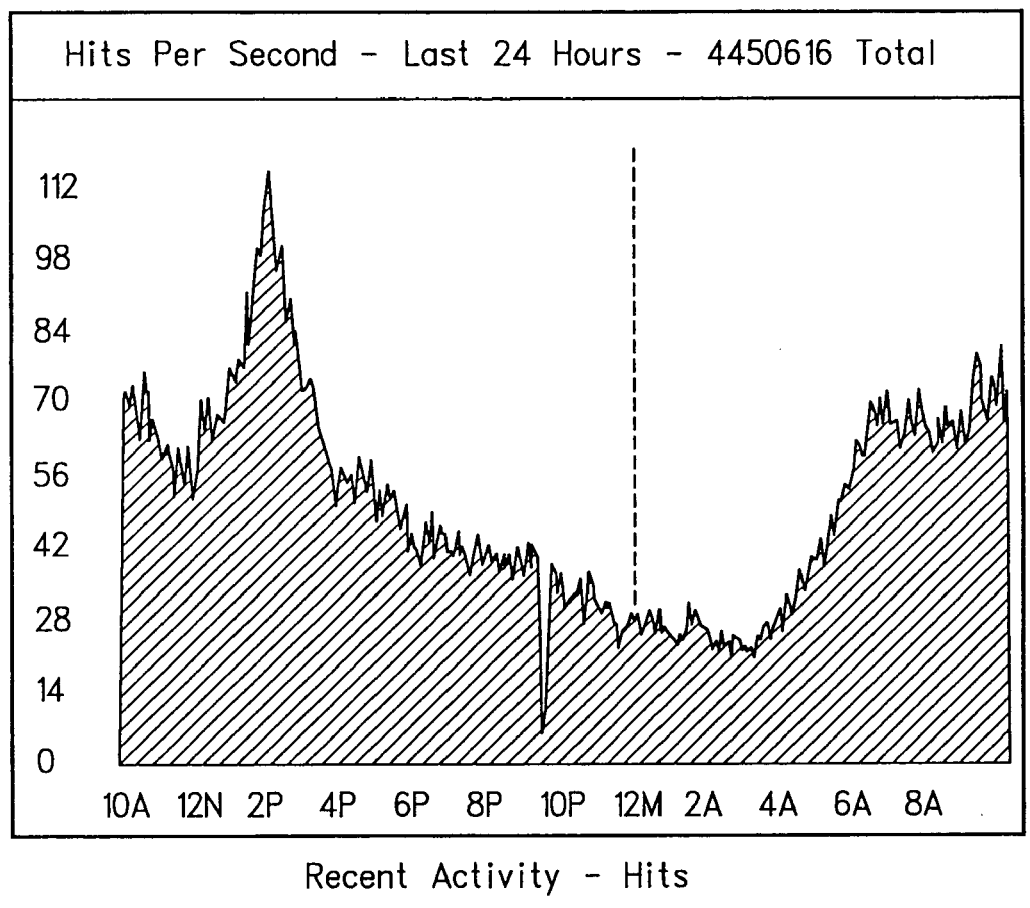

FIGS. 5C–D show several graphs. FIG. 5C shows the amount of traffic served by the content delivery network for that domain over the last 24 hours. The current traffic is shown on the far right. A dotted vertical line separates data from yesterday on the left and data from today on the right. FIG. 5D shows the number of hits per second over the last 24 hours. The total number of hits over the last 24-hour period is shown in the title bar of the graph.

In an alternative embodiment, the method includes monitoring activity by location Here, the user views the last 24 hours of content delivery traffic by location for a given domain:

1. Access the user interface at: https://speedeye.speedera.com

2. Find the By Location page in the Content Delivery section of the user interface.

Figure 5E:
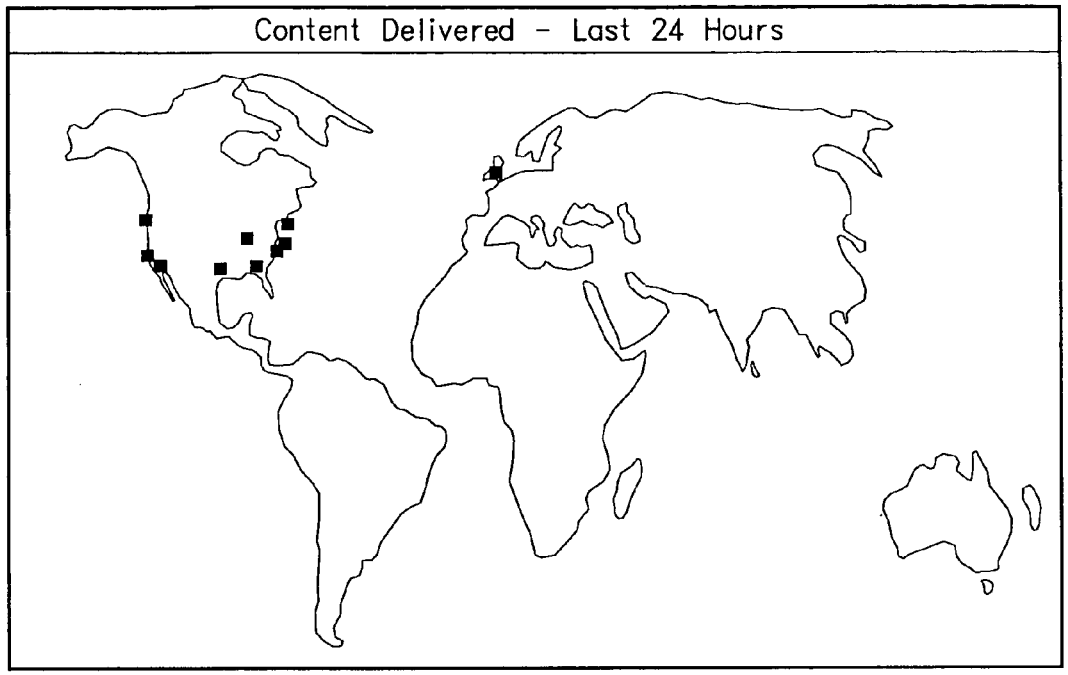

A world map appears (see FIG. 5E) that shows all the locations that served traffic for the domain.

Figure 5F:
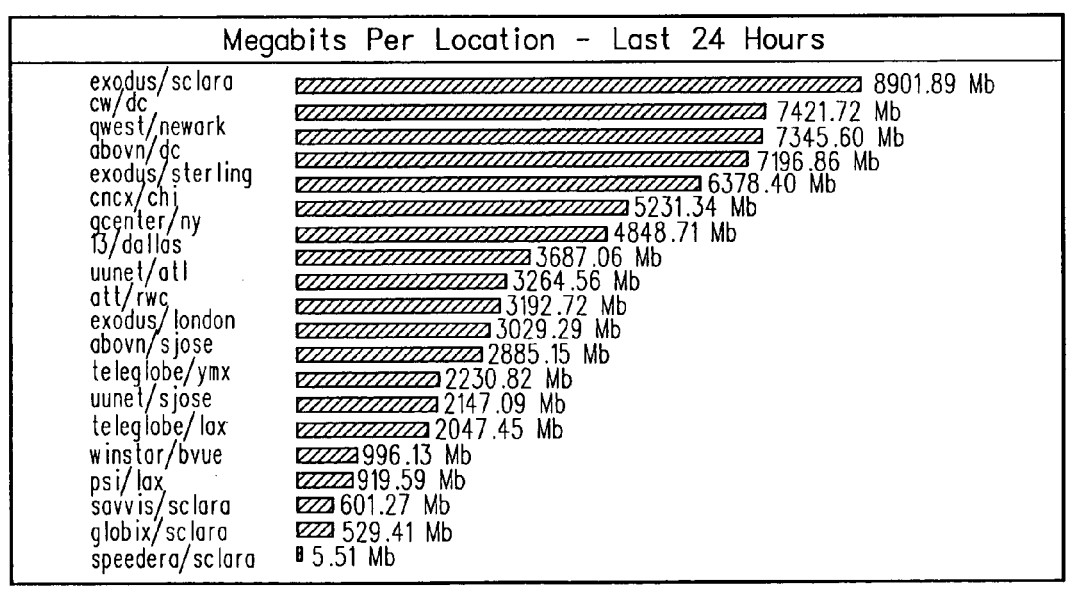

Below the world map is a bar graph (see FIG. 5F) that shows the amount of traffic served from each individual location over the last 24 hours for a given domain name. This graph is useful for many purposes, such as for determining the optimal location for a second origin site—typically, at the location serving the most traffic, where there is not currently an origin site and when that location is on a different network than the existing origin site.

D. Performing Tests

According to the present invention, selected tests can be performed to check performance, as follows:

1) Access the user interface at: https://speedeye.speedera.com

2) Locate the Tests section.

3) Select the test you want to perform.

A "page check" test can be performed. This test allows the user to check the performance of a Web page from multiple locations. To use the page check program, do the following:

1) In the text field, enter the URL to test.

2) Select the locations from which the user wants to check the page.

3) Click Check.

Figures 5G, 5H:
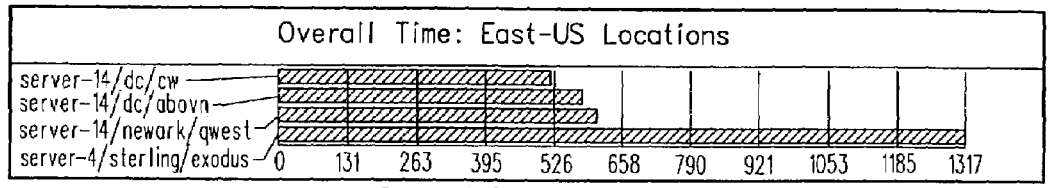

At that point, servers at the location(s) selected will be contacted to hit the Web page associated with the URL entered and time how long it takes to download the page and all its components. When the servers have completed downloading the page, the results are shown in the form of tables and graphs. FIG. 5G is the overall performance table. It appears at the top of the results.

In this example, the page took an average of 500 milliseconds (half a second) to download from the first three locations (rows) and 1317 milliseconds (1.3 seconds) from the last location. A server name, physical location, and network location identify each location. For example, the last location in FIG. 5G is labeled as "server-4/sterling/exodus." This label identifies a server on the Exodus network located in Sterling, Va., USA.

After the overall timetable, details for each location are presented in individual tables. FIG. 5H shows a table containing the details for the location "server-14, dc, cw, a server located on the Cable & Wireless Network in Washington D.C., USA. The IP address of the actual server is shown in the heading of the table so you can perform additional tests, if needed, (traceroute and so on) on the actual server performing the test.

The Location table in FIG. 5H shows data for the www.speedera.com Web site. The graph shows the performance for downloading specific components of the page. This table shows that the majority of the time spent in the download was spent downloading the home page itself. The remainder of the content (all the gifs on the subsequent lines) has been cached and is delivered from the closest and least loaded available server within the CDN, in a fraction of the time. These cached items have a domain name of www.speedera.net.

In a specific embodiment, the colors in the graph show the different components of the download including the DNS lookup time, connect time, and so on. The first time a page is checked, the DNS times will likely be very high. This high reading results from the way DNS works in the Internet. If a domain name is not accessed within a specific amount of time (the timeout period), the information will expire out of the DNS caches. The first request will again need to walk through the Internet's hierarchical system of DNS servers to determine which one is authoritative for a given domain name.

To get even more accurate results, a page can be hit twice, where the results from the second hit are used. This will give a more accurate representation of what the performance is like when the page is being hit on a regular basis. The graph is followed by the actual raw data that makes up the graph. Each row displays the following elements:

URL. The URL component downloaded

IP Address. The IP address of the server contacted to get the data

ERR. The error code (where 0 is no error)

HRC. The HTTP response code (where 200 is OK)

LEN. The length of the data downloaded

CHK. A checksum of the data

STT. The timing in milliseconds for the start time

DRT. DNS response time in milliseconds

COT. Connection Time—Syn/SynAck/Ack Time

DST. Data start time when first packet is downloaded

FNT. Final time when download is complete

END. The total millisecond timings for portions of the connection

Global Traffic Manager

The present invention provides a global traffic manager. The global traffic manager is coupled to the content delivery network. The following provides a description of the global traffic manager. The description is merely an illustration, which should not unduly limit the claims herein. One of ordinary skill would recognize many other variations, alternatives, and modifications.

1. Procedures

To use the Global Traffic Management service, the following will be used:

A. Domain name representing a service.

The domain name can be delegated for which the users are authoritative so that the present servers are contacted to resolve the domain name to an IP address, or addresses. Alternatively, a domain name can be created for the customer. That name will end with speedera.net, such as customer.speedera.net.

B. More that one IP address associated with that service.

Obtaining more that one IP address for a given service provides the following benefits from the Global Traffic Management service:

Provides better service for clusters of servers on multiple networks. If a location within a cluster fails, or the network associated with that location fails, the system can route traffic to another available network because there is more than one IP address. The system also provides better performance by sending user requests to the closest cluster of servers. These routing options are not available if a local load balancer is used to manage the cluster, since a local load balancer requires that each cluster of servers use a single IP address.

Provides better service for clusters of servers on a single network. If each computer has a different IP address, the Global Traffic Management service can be used to load-balance between individual computers.

Reduces latency for a single cluster of servers that is attached to multiple network feeds. In this configuration, the Global Traffic Management can route around network failures by testing each of the network connections and by routing user requests to the closest working connection.

In a specific embodiment, the present network is comprised of clusters of servers at points of presence located on many different backbone networks around the world. The servers provide global traffic management and distribution services for content of many kinds, including support for HTTP, HTTPS, FTP, and multiple varieties of streaming media. As previously noted, the services include: Global Traffic Management—Provides global load balancing across multiple origin sites, along with intelligent failover and other advanced capabilities such as persistence and static mapping; Content Delivery Network (CDN)—Supports content distribution and delivery for HTTP, HTTPS and FTP; and Streaming—Supports distribution and delivery of streaming media in many formats, such as Real Media, Windows Media, QuickTime and others.

The present Global Traffic Management service routes user requests to the closest available and least-loaded server. The service also tests the servers it manages for service performance and availability, using actual application-level sessions. When a service test fails, the system reroutes the traffic to other available servers. The Global Traffic Management service is based on Domain Name Service (DNS). The Internet uses the DNS to allow users to identify a service with which they want to connect. For example, www.speedera.com identifies the Web service (www) from speedera.com.

When users request a service on the Internet, they request it by its DNS name. DNS names were created to make it easier for users to identify computers and services on the Internet. However, computers on the Internet do not communicate with each other by their DNS names Therefore, when a user enters a domain name, domain name servers on the Internet are contacted to determine the IP addresses associated with that name.

The Network includes specialized domain name servers that use advanced mechanisms to determine the IP addresses associated with a given domain name and service. These servers work seamlessly with the Internet DNS system. To determine the best IP address, or addresses, to return when a user requests a service on the Internet, the DNS system does the following:

1. Uses IP addresses to monitor the performance of a service on individual computers or clusters of computers 2. Determines latency and load metrics between users and servers on the Internet 3. Performs tests on the Internet to determine the quality of service a user would receive when connecting to a specific computer or cluster of computers Procedures This section describes the procedures you can perform to implement and then monitor the performance of the Global Traffic Management service. To implement the Global Traffic Management service, the customer or user does the following:

1. Sign up for the service.

2. Contact the server location and provide the following information: The domain name of the service you want the system to manage; The IP addresses associated with that service; A description of the service and how it should be tested for performance and availability; The interval after which tests should be performed; What the service check should look for, such as specific information in a returned Web page. Whether the user would like traffic weighted so that more traffic is sent to one IP address over another.

In addition to the normal routing around failures to the closest server, the system can also be set up for security purposes. The system can contain hidden IP addresses that are only given out in the case of failure of other IP addresses. The user might want to use this feature to prevent a denial of service attack. If one IP address is attacked and becomes unavailable, another will then appear and traffic will be routed to it. This can make attacking a Web server more difficult since the IP address is not published until the failure occurs.

Figures 6A, 6B:
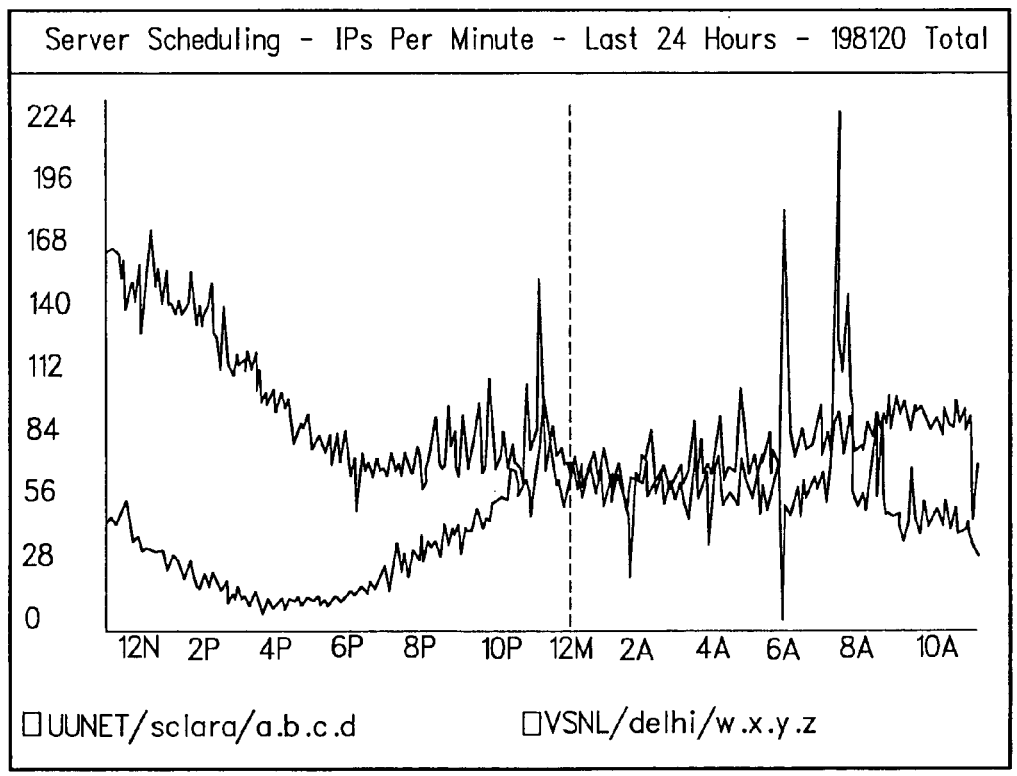
FIGS. 6A to 6E are simplified diagrams of global traffic management system according to an embodiment of the present invention.

In a specific embodiment, the method allows the user to monitor the operation of the Global Traffic Management service for domain names. Preferably, the method outputs information on a Web-based, user-interface that runs on a secure server on the Internet that can be accessed only through a Web browser that supports secure connections (SSL). Here, a start section of the user interface contains a table that shows all the domains and associated origin domains your account is set up to use. See FIG. 6A.

In an alternative embodiment, we can also view the last 24 hours of traffic management activity for a given domain:

1) Access the user interface at:

https://speedeye.speedera.com

2) Find the Recent Activity page in the Traffic Management section of the interface.

The main graph in the page shows how traffic was routed over the last 24 hours. A dotted vertical line separates yesterday on the left from today on the right. The lines in the graph show how many times each IP address was given out. See the example in FIG. 6B.

In the example, the present Global Traffic Management system made 198120 traffic routing decisions over a 24-hour period. The lower decision line in the graph represents an IP address for "Delhi, India." The upper decision line represents an IP address for "Santa Clara, Calif.; United States." The Y axis represents the activity levels. The X axis represents the Santa Clara time: N for noon, P for p.m., and A for a.m.

At 6:00 a.m. in Santa Clara, one line dropped to the bottom of the graph and the other spiked upward. This happened because the system routed around a failure at a data center. When the "Delhi" IP address failed its service test, the Global Traffic Management system routed traffic to the "Santa Clara" IP address.

The example also shows that the "Delhi" IP address is more active at night (Santa Clara time), and the "Santa Clara" IP address is more active in the daytime. The difference in activity results from the changes in time zones. When people in India are active, the traffic manager routes their requests to the closest available server with the best service response time. For users in India, when it is their daylight and their peak time, the best IP address is often the site in Delhi. For users in the U.S., when it is their peak time, the best IP address is the site in Santa Clara.

In still an alternative embodiment, we can view the last 24 hours of traffic management activity by location for a given domain:

1. Access the user interface at:

https://speedeye.speedera.com

2. Find the By Location page in the Content Delivery section of the user interface.

Figure 6C:
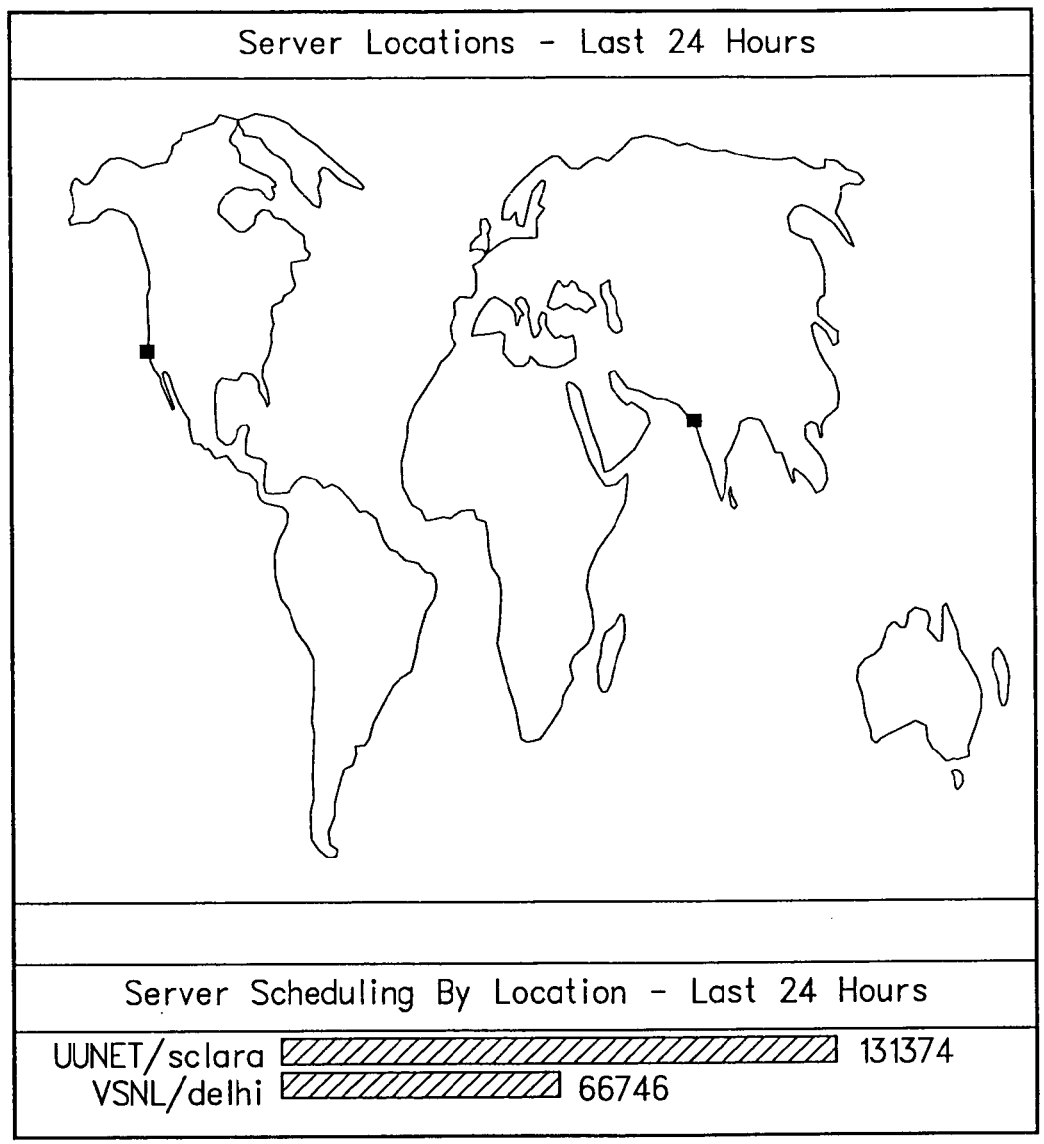

Here, a world map and a bar chart appear. They show where the traffic manager routed traffic (geographic and network locations) over the last 24 hours for a given domain name. See the example in FIG. 6C. The bar-chart example shows the number of times each location was chosen to serve traffic over the last 24 hours. In the example, the traffic manager chose the "UUNET/sclara" (Santa Clara, Calif.; United States) location to serve most of the traffic.

In other aspects, the method includes performing tests. Here, the interface also contains a utility that allows the user to check a Web page from multiple locations. If an HTTP service is used, a quick status check can be executed as follows:

1) Access the user interface at:

https://speedeye.speedera.com

2) In the text entry field, enter the URL for the page you want to check.

3) Select the locations from which you want to check the page.

4) Press the Check button. This causes servers at the location, or locations, selected to download the Web page associated with the URL you entered in Step 2.

When the servers have completed downloading the page, the page-performance results are shown in the form of tables and graphs. The first table (see FIG. 6D) is the overall performance table. It appears at the top of the results. In this example, the page took an average of 500 milliseconds (half a second) to download from the first three locations (rows) and 1200 milliseconds (1.2 seconds) from the last location.

A server name, physical location, and network location identify each location. For example, the last location in FIG. 6D is labeled as "server-4/sterling/exodus." This label identifies a server on the Exodus network located in Sterling, Va., USA.

After the overall timetable, details for each location are presented in individual tables. FIG. 5 shows a table containing the details for the location "server-14, dc, cw, a server located on the Cable & Wireless Network in Washington D.C., USA. The IP address of the actual server is shown in the heading of the table so you can perform additional tests, if needed, (traceroute and so on) on the actual server performing the test. The Location table in FIG. 6E shows data for the www.speedera.com Web site.

Figures 6D, 6E:
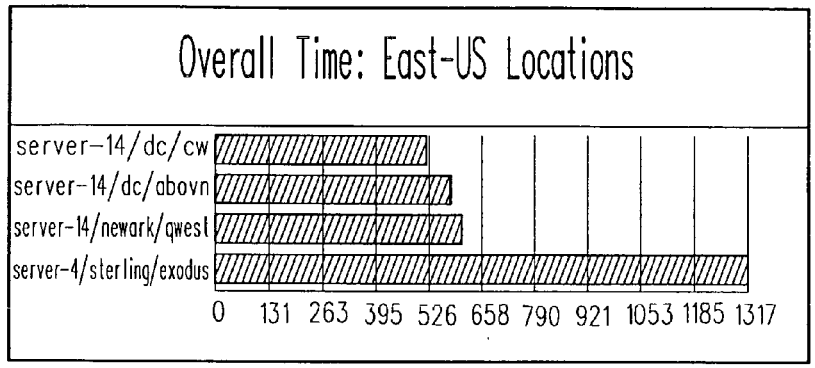

The graph in FIG. 6E shows the performance for downloading specific components of the page. This table shows that the majority of the time spent in the download was spent downloading the home page itself.

The colors in the graph show the different components of the download including the DNS lookup time, connect time, and so on. The first time you check a page, the DNS times will likely be very high. This high reading results from the way DNS works in the Internet. If a domain name is not accessed within a specific amount of time (the timeout period), the information will expire from the DNS caches. The first request will again need to walk through the Internet's hierarchical system of DNS servers to determine which one is authoritative for a given domain name.

To get more accurate results, a page can be hit twice and the results from the second hit can be used. This will give you a more accurate representation of what the performance is like when the page is being hit on a regular basis. In the Location Table, the graph is followed by the actual raw data that makes up the graph. Each row displays the following elements:

URL. The URL component downloaded

IP Address. The IP address of the server contacted to get the data

ERR. The error code (where 0 is no error)

HRC. The HTTP response code (where 200 is OK)

LEN. The length of the data downloaded

CHK. A checksum of the data

STT. The timing in milliseconds for the start time

DRT. DNS response time in milliseconds

COT. Connection Time—Syn/SynAck/Ack Time

DST. Data start time when first packet is downloaded

FNT. Final time when download is complete

END. The total millisecond timings for portions of the connection

In a specific embodiment, the Global Traffic Management (GTM) system automatically routes around failures to services on the IP addresses it manages. Here, the system can also be: Adding or removing a domain name from the system; Adding or removing IP addresses from the system; and Changing the way a service is monitored.

The Speedera DNS server (SPD) is the core component of the Speedera GTM solution and provides load balancing across the servers distributed all over the Internet. The SPD acts as the traffic cop for the entire network. It handles the DNS requests from the clients, resolving hostnames to IP addresses. The SPD makes the decisions about which IP address to return for a given hostname based on the static mapping of hostnames to the servers (configuration file), information it collects about the state of the servers in the network (service probes), information about the network latency from the servers to the client (latency probes), the packet loss information for the POP (packet loss probe), bandwidth usage for the POP (SERVPD) and static latency information (client configuration). This enables the invention to direct clients to the servers that are ideally suited to service the client requests.

If SPD cannot answer the request, it will forward the request to the named server. This allows SPD to handle only the queries that are relevant to the GTM solution. SPD handles the following type of queries:

A Records
PTR Records

SOA Records
LOC Records
NS Records
ANY Record

SPD server is designed to work around problems in the network. It can handle a single server or a single POP failure. It can also work around more catastrophic failures such as all latency probes going down. In these extreme cases, the load balancing will not be optimal, but the SPD and the entire Speedera Network will still function.

SPD supports a two-tier architecture that can be used to increase the number of DNS servers in the system to more than the maximum allowed for .com domains. It can also be used to direct the client DNS servers to the closet Speedera DNS servers.

SPD logs the statistics about the IP address it gives out in response to incoming requests. This can be used to monitor the effectiveness of the GTM solution in distributing load across multiple servers.

Figure 7:
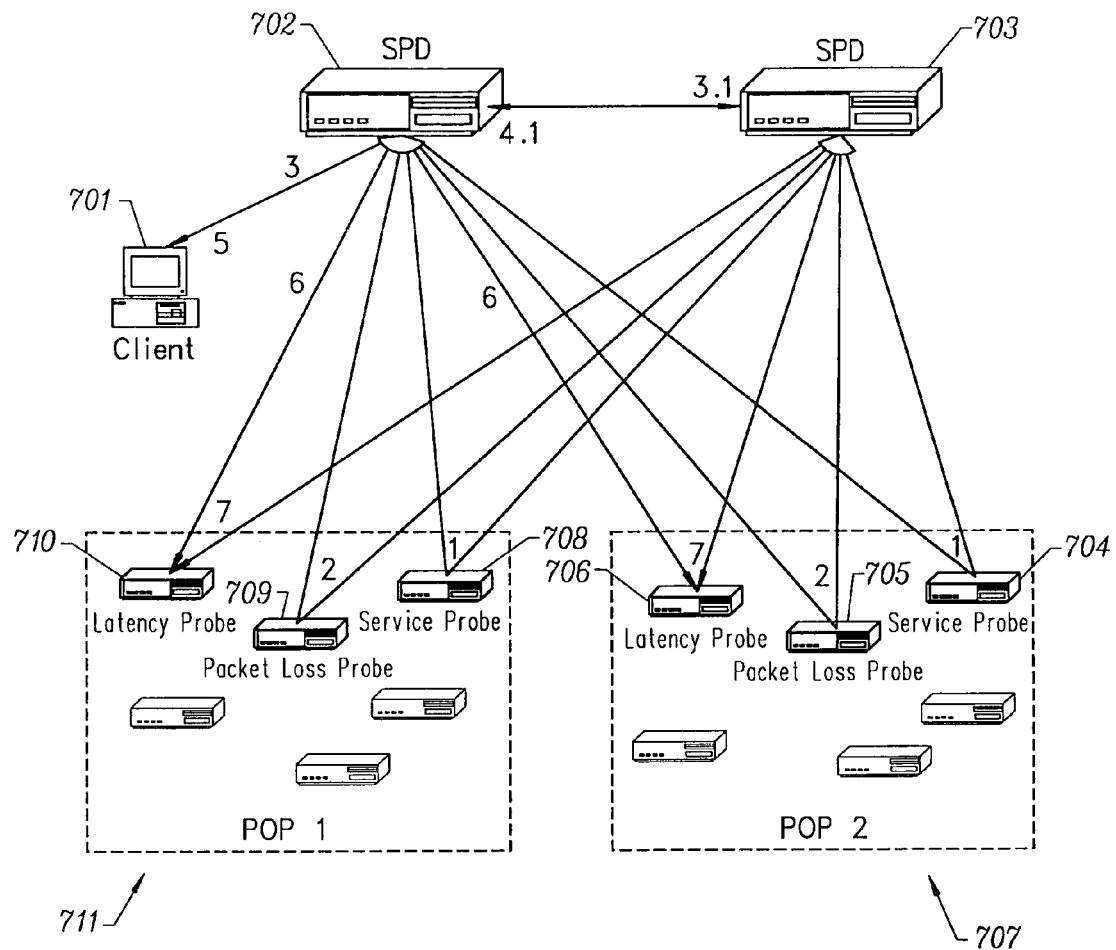
FIG. 7 is a block schematic diagram showing the interaction between the Speedera DNS Server (SPD) and other components according to the invention.

Referring to FIG. 7, the SPD is highly scalable; it uses hashing tables optimized for block memory allocation to speed up access to all the internal tables. It can easily scale to handle thousand of servers and hostnames in the network. The only limiting factor is the amount of physical memory available on the servers. The figure below shows how SPDs interact with other components.

1. SERVPD 704, 708, sends the load information about all the servers in the POP 707, 711, to all the SPD servers 702, 703, periodically. This information is also used to update the bandwidth usage for the POP 707, 711.
2. SPKT 705, 709, sends the packet loss information to all the SPD servers 702, 703, periodically.
3. Client DNS 711 sends a DNS request to SPD server 702.
   3.1. If the SPD server 702 is not responsible for the zone in which the client address falls, it forwards the request to one of the SPD servers 703 responsible for the zone.
4. SPD 703 uses the cached latency, load and packet loss values to determine the address to return. SPD 703 collects all the probe information asynchronously to improve the response time for the DNS requests.
   4.1. If it was a forwarded request, SPD server 703 sends the response back to the SPD server 702 that forwarded the original request.
5. SPD 702 sends the response back to the client
6. SPD 702 sends a Latency request to LATNPD 706, 710. If the probe method for the client 701 is specified in the client configuration file, it sends the probe method to be used along with the latency request. SPD 702 sends latency requests only for the servers configured for the hostname for which it got the DNS request. Latency requests are only sent for the servers with dynamic latency value and if latency is factored into the load balancing algorithm.
7. LATNPD 706, 710, probes the client 701 to determine the latency and sends the latency information to all the DNS servers in the same zone.

Configuration Files

The configuration file contains all the static information about the Speedera Network. It contains the list of POPS and the servers present at each POP. It also contains the list of hostnames serviced by the Speedera Network and maps the hostnames to the servers that can serve the content for that hostname. Most of the parameters needed to configure SPD are contained in the configuration file and can be used to fine-tune the load-balancing algorithm, frequency of probes etc.

In addition to the main configuration file, there is a client configuration file that can be used to specify the static latency from a client to the various servers in the network and to specify the latency probe type for a give client. It can also be used to specify conditions under which a client is probed (Never, always, in case of a server failure).

Service Probes

Service Probe Daemon (SERVPD) periodically probes all the servers in the POP and sends the status information back to all the SPD servers in the Speedera Network. There is one service probe for each type of service that is supported by the GTM. This allows the fine tuning of each service probe to return the load metrics that accurately reflect the load on the server for that service. For example, for HTTP the time taken to retrieve a standard Web page from the Web cache as the load metrics. There is also a generic load probe that measures the CPU and memory utilization of the servers. This probe can be used as the load metrics for the services for which there are no custom service probes. Currently there are custom service probes for HTTP, HTTPS, FTP and streaming servers.

The load information is used by the SPD to make the decision about which server to return. SPD keeps track of how old the load information is, so that if the entire POP goes down, it can detect it by simply looking at the load timestamp. If the load information for a server is stale, or the server is down, the SPD tries not to direct any traffic to that server.

The special service type of NOLOAD has a static load value of 1 and its time stamp is always current. This service type can be used to load balance services for which we do not have a probe and want to assume that they are always up. It can also be used to effectively factor serve load out of the load-balancing algorithm.

Bandwidth Probe

There is no separate bandwidth probe. The SNMP probe in SERVPD is used to measure the bandwidth utilization for the switch. The aggregate bandwidth usage for POP is measured as the sum of the load metrics for all the servers in the POP with the service type of "SWITCH".

Latency Probes

Latency Probe Daemon (LATNPD) is used to determine the network latency from a POP to the client. Whenever SPD gets a request from a client, it sends a latency request for that client to the latency probes. The latency probes then find the network latency from the POP to that client and return it to all the SPD servers in the same zone. LATNPD uses a number of different probes to determine the latency. Multiple probe types are required since all the clients do no respond to a single probe type. Probe types include PING, DNS PTR, UDP packets to high ports looking for a noport responses as well as any others that may generate a reply without spending much time at the target location. The order in which these probes are used to determine the latency can be configured using the configuration file. The type of probe used to determine the latency for a given client can also be specified in the client configuration file.

SPD sends latency requests only for the servers configured for the hostname for which it got the DNS request. Latency requests are only sent for the servers with dynamic latency value and if latency is factored into the load balancing algorithm.

Both LATNPD and SPD cache the latency information. SPD sends a latency request only to a subset of the latency probes and it sends the request only if the latency information it has is stale. LATNPD does a probe only if the latency information it has is stale, otherwise, it returns the values from its cache. This is done to reduce the amount of traffic generated from the latency probes to the client machines. To further reduce the latency probe traffic, static latency information can be input into SPD. SPD also saves the dynamic latency tables across system shutdowns to reduce the latency traffic at startup.

Packet Loss Probes

The Packet Loss Probe (SPKT) is used to determine the packet loss for a POP. A limited subset of SPKT daemons probe all the POPs in the Speedera Network to determine the packet loss for the POPs and report it back to SPD. Only a limited subset of POPs do the actual probing to reduce the amount of network traffic. The probe interval, number of POPs doing the probing, packet size, and number of packets used to determine the packet loss can be fine tuned using the configuration file.

Persistence

SPD also supports persistence. For persistent hostnames, SPD returns the same IP addresses, for a given client. The SPD server maintains a table containing the IP address given out for a given hostname to a client. This table is created dynamically in response to incoming requests and is synchronized across all the SPD servers responsible for a given zone. If the same client tries to resolve the hostname against a different SPD server in the future, it will get the same result. Also, access and refresh timeouts for the persistent entries can be configured on a per hostname basis.

Zones

To reduce the memory requirements and network traffic, the entire Internet address space is broken up into multiple zones. Each zone is assigned to a group of SPD servers. If an SPD server gets a request from a client that is not in the zone assigned to that SPD server, it forwards the request to the SPD server assigned to that zone. The SPD servers need to keep latency and persistence information only for the clients that fall in the zone assigned to the server. The latency probes only send the client latency information back to the SPD servers responsible for that client. Also the SPD servers only need to synchronize the persistence table with the SPD servers responsible for that zone, not all the SPD servers in the network.

Each SPD server probes all the other SPD servers to determine the latency. When SPD has to forward the DNS request to servers in the other zone, it selects the server with the best (lowest) latency value. This allows the SPD server to dynamically load balance between the SPD servers in the same zone and avoid servers that may be down or are having some other problems.

In the DNS response SPD includes the SPD servers that are authoritative for a given client address. That way the client can query the authoritative name servers directly next time, avoiding the delay involved in forwarding the DNS request from one SPD server to another.

Two Tier Architecture

SPD supports a two-tier architecture that can be used to increase the number of DNS servers in the system to more than the maximum allowed for .com domains. It can also be used to direct the client DNS servers to the closest Speedera DNS servers and to prevent the client DNS server from flip-flopping between all the DNS servers authoritative for speedera.net domain.

When returning the NS records, the normal load balancing is performed to determine the SPD servers that are best suited to handle the queries for the client and return only those NS records. This helps in directing the client DNS server towards the SPD servers that is best suited to handle the queries for it.

To support the two-tier architecture the hostname entries are dynamically mapped in the configuration file to the second tier domain names (www.speedera.net to www.edge.speedera.net). SPD provides support for any number of second level domains. The "edge" and "persistent" domains are special domains that are used for the dynamic transformation of the host names.

The persistent.speedera.net domain is used to handle all the persistent hostname queries. If the "persistent" domain is not defined then the root domain (speedera.net) is used to handle the persistent queries.

The following algorithm is used to generate the mapped hostnames and validate the hostnames in the configuration file:

1. Get the domain authoritative for the hostname, using longest suffix match. Root is authoritative for all the hostnames that do not have the speedera.net suffix.
2. If the hostname is of the type GTM and persistent
   a. If persistent domain is defined and the authoritative domain for the hostname is not persistent.speedera.net then flag an error
   b. If persistent domain is not defined and the authoritative domain for the hostname is not root then flag an error
3. If the hostname is of the type GTM do not do the mapping
4. If the hostname is persistent and a domain other than the root is authoritative for that hostname and if persistent domain is defined and the authoritative domain for the hostname is not persistent.speedera.net then flag an error
5. If the hostname is persistent and a domain other than the root is authoritative for that hostname and if persistent domain is not defined flag an error
6. If a domain other than the root is authoritative for the hostname do not do the mapping
7. If the hostname is persistent and "persistent" domain is not defined, do not do the mapping.
8. If the hostname is not persistent and "edge" domain is not defined, do not do the mapping.
9. If the hostname is static do not do the mapping.
10. If the hostname is persistent, MapDomain is persistent.speedera.net.
11. If the hostname is not persistent MapDomain is edge.speedera.net.
12. If the hostname belongs to one group of servers and uses global load balancing parameters, map the hostname to <service>-<group>.<MapDomain>
13. Remove the domain suffix from the hostname
14. Map the hostname to <prefix>.MapDomain>

The Speedera Network consists of a number of Linux machines running Speedera software. Speedera software consists of eight components that are delivered as a single product. When deployed across a large number of machines, it creates a network that provides a complete solution for content hosting and delivery.

Customers can store content such as HTML, images, video, sound and software in the network for fast and highly available access by clients. The network also provides load balancing and high availability for servers outside the network. Customers with generated content, such as search engines, auctions and shopping carts, can use the latter feature to add their own content servers to the network.

The system requires no software or hardware to be installed or run at a customer site. The system may be monitored using a standard Web browser. It provides an HTML interface that displays the networks current status as well as historical statistics.

Software Components

The system is comprised of the following distinct software components:
NameServer
WebCache
Streaming Media Servers
FileSync
NetProbes
LogServer
NetView
AdminTools
Shared NameServer DNS server software that performs name to IP address mapping. When queried to resolve a name from a client's DNS server, it returns an IP address that has the ability to serve content for that name and that is best suited to handle the request in terms of load (service health), latency, packet loss and availability. The DNS server writes log information to files that are picked up and maintained by the LogServer software.

WebCache

Caching Web server software that responds to requests for Web content from clients (Web browsers). If the requested content does not exist in memory, it will generate a request to an origin site Web server to fetch the content. The caching servers write information about the content delivered to log files that are picked up and maintained by the LogServer software.

Streaming Media Servers

The streaming media in the servers will be off the shelf streaming media servers including ones from Real Networks, Microsoft and Apple. A logging system allows the logs to be picked up by the LogServer software and plugins allow the configuration of the servers remotely.

FileSync

The FileSync software is the infrastructure to support publishing files and synchronizing them from one location to many locations. These are used to publish large download files and also to publish on-demand streaming media files to the streaming media servers.

NetProbes

A number of probes that include probes that:
Determine server load and availability (including service health, load and availability)
Determine packet loss and latency problems on links in the network
Perform content checks to ensure servers are delivering correct content
Determine latency between points on the network and clients of the network
Perform ongoing monitoring of services
Probes run constantly and send results to servers running NameServer software. The also log results to a log file that is picked up and maintained by the LogServer software.

LogServer

Server software that picks up log files and then transmits them, receives them in a central location, stores them on disk, breaks them out into categories and processes them to generate statistics and monitoring information. The software also responds to requests for current and historical information from servers running NetView software.

NetView

Server software that provides an HTML interface to current and historical statistics for end-customers and network operations. Information about the network is obtained from servers running LogServer software. Web server CGI programs are used to provide the HTML user-interface. NetView software also provides an interface that allows customers to flush content from the network as they update the content on their servers, manage files in the network, and set up live streaming events.

AdminTools

Tools to configure and administer the site including tools to spider a Web site to load the caches with content and tools to update the global configuration file.

Shared

A set of client and server programs that all the various software components require. This includes a server that transmits and receives configuration files. Installing this software is not an option. It is installed automatically when any one of the other software components is installed.

Any combination of the software components (with the exception of "Shared" which is always installed) can be installed on a single machine. In a normal deployment, however, many machines will serve a single purpose (DNS name server, for instance) and will only have one of the software components installed.

How the System Operates

The Speedera Network consists of a number of server machines installed at various points of presence (POPs) around the world. Each POP will contain some mix of the Speedera software.

The vast majority of POPs will contain NetProbes and WebCache software. The NetProbes software performs network latency probes from each POP to determine the latency from users to the POP. The NetProbes software will also run probes against other POPs and perform content verification to ensure machines at the various POPs are operating correct. The WebCache software is used to deliver content.

A number of the POPs will need to be outfitted with large disk storage and will contain Streaming Media servers and FileSync software. A limited number of POPs will contain NameServer software to perform traffic management for the whole system.

The Speedera Network Operations Center (NOC) contains NetView, AdminTools and LogServer software. Two NOCs can be created for redundancy and in the case of the failure of one, the backup NOC should pick up automatically.

Figure 8:
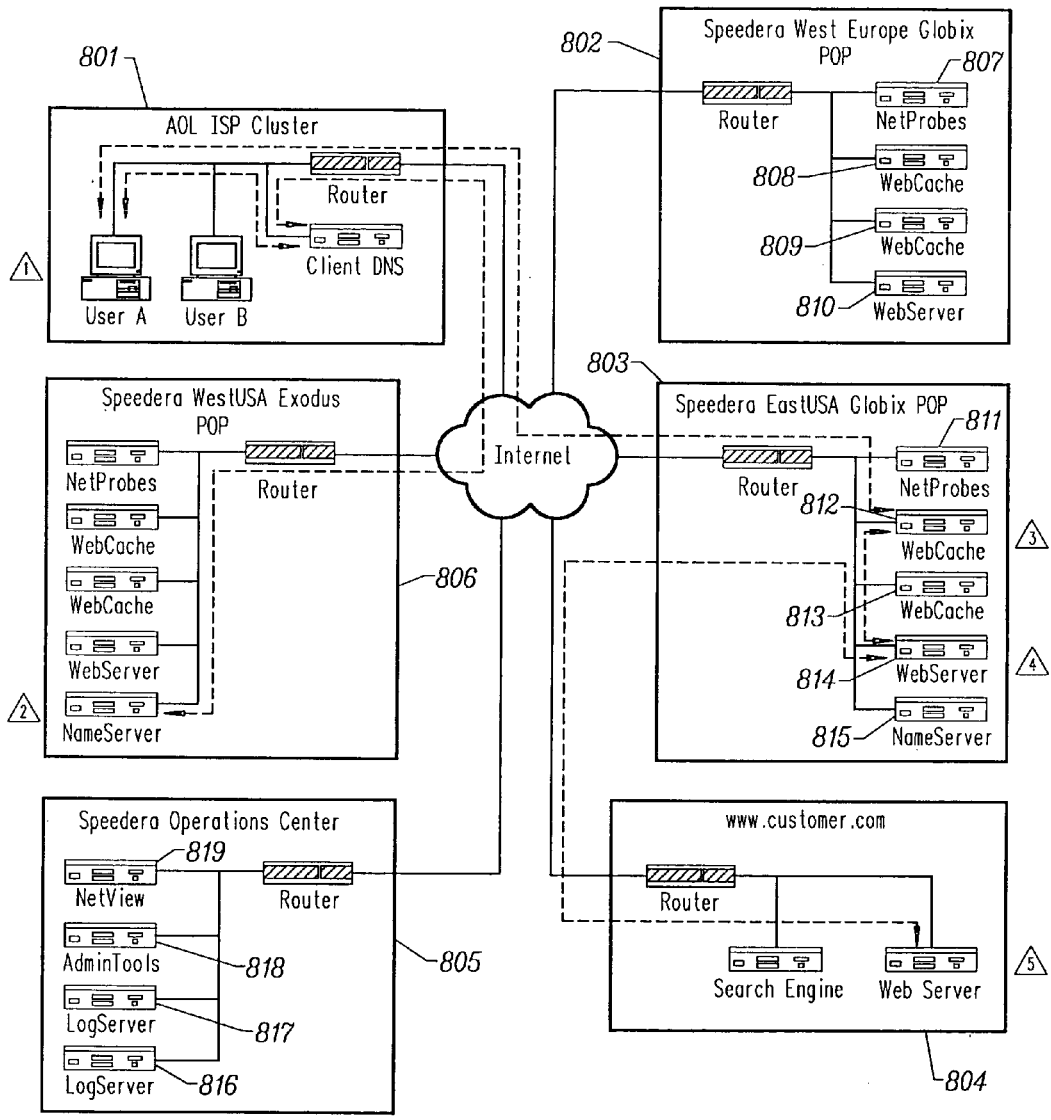
FIG. 8 is a block schematic diagram showing a POP Speedera network with the invention's software components distributed among POP servers and Network Operations Centers according to the invention.

With respect to FIG. 8, a four POP Speedera Network is shown. The dashed lines and triangles in the diagram show the path network traffic follows when a piece of stored content is initially published to the network. Three content delivery POPs 802, 803, 806, and one NOC 805 are shown. Two POPs are hosted at Globix, one in Europe 802 and one on the east coast of the USA 803. One POP is deployed at Exodus on the west coast of the USA 806.

As stated above, the POP servers contain a mix of Speedera software. POP 802 contains NetProbes 807, WebCache 808, 809, and WebServer 810. POP 803 contains NetProbes 811, WebCache 812, 813, WebServer 814, and NameServer 815. The NOC 805 contains NetView 819, AdminTools 818, LogServer 817, 816.

Customers of the Speedera Network will maintain their own Web server (or servers) with their copy of their content on it. They don't have to change the way they test and manage their Web site in any way to use the content hosting service.

The Speedera network provides two primary services. First, it provides content hosting for content that can be cached and stored (images, video, software, etc.). Second, it provides load balancing and traffic management for services that can't be stored. The latter is used to load balance search engines, shopping engines, etc. The network also contains other services including monitoring and live streaming, however, the most basic services are content hosting and load balancing.

Content Hosting

To host HTTP or HTTPS Web content on the Speedera network, customers either delegate a DNS name to Speedera or host content under a speedera.net domain name.

In the former case, the customer might delegate "images.customer.com" to Speedera's DNS servers using a CNAME or by directly delegating the domain. If the customer already uses an images.customers.com domain (some customers use this method for static content, for example EBay uses pics.ebay.com) they wouldn't need to make any changes to their Web site to have their content published to the network. The Speedera network gets all hits to images.customer.com and any time the Speedera network gets a hit for content it did not contain, it goes back to the customer's Web site to retrieve the content and store it in the system. Once stored in the system, the customers Web site is never hit for that piece of content again.

When a customer updates its Web site, it can tell the Speedera network that the content was updated by entering its URL on a Web page used by Speedera customers to invalidate content. If multiple changes to their Web site are made, they can invalidate whole trees of content or simply the whole Web site. In the latter case, their Web site would be flushed from the system and the next hit would cause the content to be grabbed from their Web site.

Alternatively, the Web cache could make if-modified-since requests back to the origin site at specified intervals to check to see if the content it has cached is fresh. Also, the cache can look at expiry headers in the HTTP content it retrieves from the origin site to ensure freshness.

If the customer uses the speedera.net domain name to host their content, they don't need to delegate a domain name to Speedera. Speedera will create a "customer.speedera.net" domain name and associate it with some portion of the customer's Web site. If customer.speedera.net gets a hit for content it does not contain, it will hit the appropriate content on the customer's Web site to pick up that content and store it in the network.

In both cases, the path network traffic flows is similar. Consider the case where the customer has delegated images.customer.com to Speedera to host their images. The path of the first user request is as follows:

1. User hits www.customer.com generating a DNS request to their client DNS
2. Request to resolve www.customer.com from client DNS goes to customer.com DNS server
3. customer.com DNS resolves the name to the customer's Web server IP address
4. Web page is returned to user
5. Web page has embedded tags to get images from images.customers.com
6. Request to resolve images.customers.com goes to a Speedera DNS server
7. NameServer software on the DNS server returns the Speedera WebCache IP address that is closest to the user, available and least loaded
8. WebCache does not have the content for the request so it performs HTTP request to the customer's Web site to obtain the content The next time the request for the same content comes through the system, it will come directly from the cache.

If a customer hosts content off the speedera.net domain name (customer.speedera.net), the process is exactly the same as the process when the content is hosted on a name delegated by the customer.

Traffic Management

Another service the Speedera network provides is load balancing and traffic management for servers that aren't in the network. By combining traffic management and content hosting, the network can provide a complete load balancing and high availability solution for Web sites.

The network provides load balancing at the DNS level. As in content hosting, the customer will either delegate a DNS name to Speedera or be assigned a speedera.net domain name. When the Speedera DNS server receives a request to map a name to IP address it will return an IP address that is best suited to handle the response. The IP address returned will be the server that is closest to the user (latency), has the least load, and that is available and can handle hits to that domain name.

The DNS level load balancing will commonly be used in combination with content hosting. When both are used in combination, the path a user request follows is:

1. User hits www.customer.com generating a DNS request to Speedera DNS
2. Speedera DNS determines which customer Web server is best suited to handle request
3. Customer's Web server generates main page and returns to user
4. Web page has embedded tags to get images from images.customers.com
5. Request to resolve images.customers.com goes to a Speedera DNS server
6. NameServer software on the DNS server returns the Speedera WebCache IP address that is closest to the user, available and least loaded
7. If WebCache has content cached the content is returned, otherwise process is as above Notice that high availability and high performance are available from the beginning. All DNS requests go through the Speedera network. Content that can be hosted is hosted through the Speedera network so it may be delivered from a point closest to the user.

To determine latency from the client DNS to the customer's server IP addresses, latency information is used from the closest POP to the customer location. In some cases, the customer may be hosting at a co-location facility we already have latency probes running on. For large customers that have servers located at a location that is not close to one of our POPs, we could run a latency probe server at their site.

When used for traffic management, the customer must have a setup that allows for failover. If the customer only has one IP address for their www site, then the Speedera network can't provide any load balancing or high availability for it. When the customer has 2 or more IP addresses, the network can provide load balancing, high availability and closest point matching for their service.

Configuration

The configuration of the Speedera Network is maintained by centrally managed configuration files. These files are known as the "global configuration" files or "Speedera configuration" files. Every server in the network that needs configuration information has a copy of the appropriate current Speedera configuration file.

A configuration file contains all the configuration information for that portion of the network. Some of the data the configuration file contains is:

List of servers allowed to change the configuration
List of domains the network is responsible for
List of services the machines in each POP supports
List of probes that perform latency checks at each POP At any time, a new configuration file can be pushed to all machines that need it in a safe manner using the AdminTools software.

No statistics, status or extended information is kept in the configuration file. It must contain only the configuration information and not customer names or any other information not required by the network to keep its size at a minimum and to reduce the frequency of it needing updates.

Monitoring

Real-time and historical information about the site is available through HTML by connecting to a server running NetView software.

Maintenance

The system is maintained using the AdminTools software. Some limited maintenance is available through HTML including the ability to purge content from all the caches in the network when original content is updated.

Software Requirements

Figure 9:
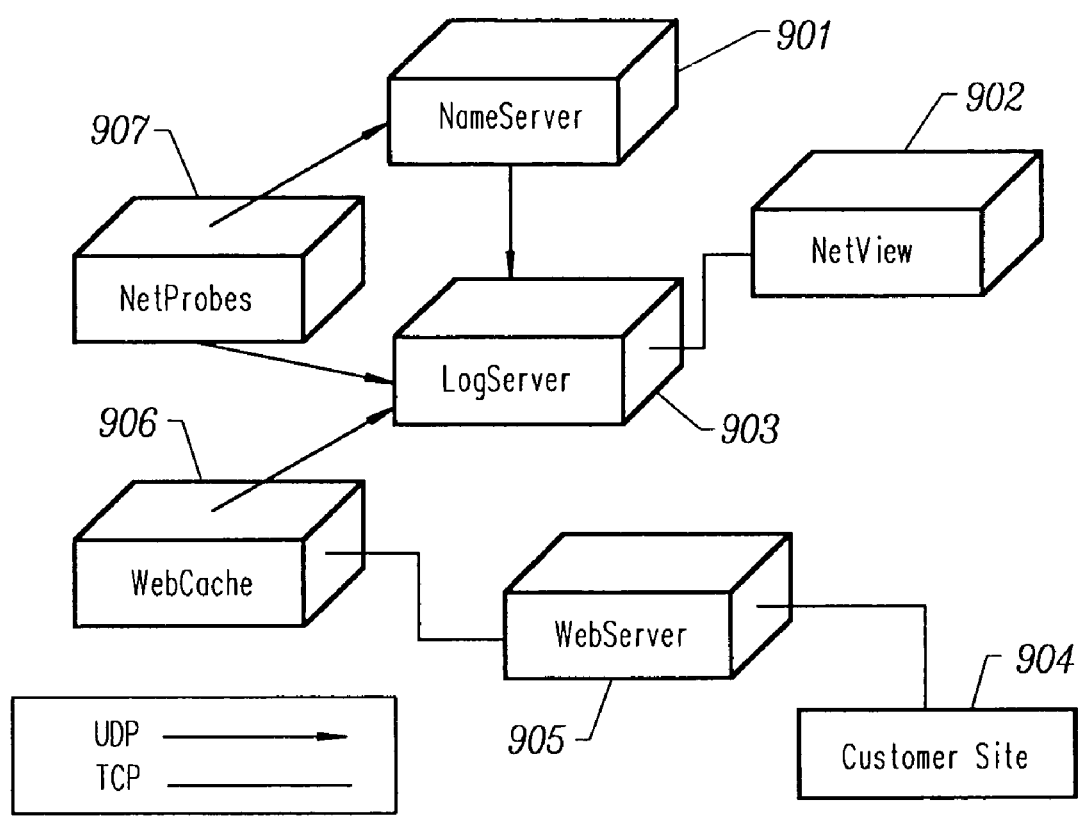
FIG. 9 is a block schematic diagram showing the interaction between software components of the invention according to the invention.

Referring to FIG. 9, the Speedera software consists of several distinct software components. The various components, NameServer server 901, NetProbes 907, LogServer server 903, NetView server 902, WebCache server 906, and WebServer server 905, interact with each other and the customer Web site 904, as described above.

WebCache Description

Terminology

CacheServer (aka WebCache)

A POP server that serves requests that are cached in memory and on disk.

WebCache is the Web caching server software that responds to requests for Web content from clients (Web browsers). If the requested content does not exist in memory or on disk, it generates a request to an origin site to obtain the content. The caching servers write information about the content delivered to log files that are picked up and maintained by the LogServer software.

At a regular fixed interval, the server compresses and sends the logs of the content delivered to the log analysis servers. This information is used for billing as well as by customers for log analysis. In the case where a hardware box is used, the server that sends the logs will need to be written as a separate daemon, but it will exist as part of the WebCache software.

Netprobes Description

The NetProbes software component comprises server software executing on a computer system that performs probes to:
    Determine server load and availability
    Perform content checks to ensure servers are delivering correct content
    Determine packet loss and latency on individual routes
    Determine latency between points on the network and clients of the network
    Perform ongoing monitoring of services Probes run constantly and send results to servers running NameServer software. They also log results to a log file that is picked up and maintained by the LogServer software.

The NetProbes software performs service availability/metric and latency probes and sends the results to servers running NameServer software. There are 2 fundamental probes: (1) service probes; and (2) latency probes.

Service probes determine service availability and load (metrics) for each content delivery machine in the network. Service probes monitor things like HTTP total response time, FTP total response time, etc. Service probes run constantly, sending current metric and availability information to all DNS servers in the network. Probe intervals and configuration of service probes are set in the global configuration file.

Latency probes determine latency from their point to client DNS servers that send requests to Speedera DNS servers. The Speedera DNS servers drive the latency probes. When a DNS server determines that it needs latency information from a probe, it sends a request to the probe and the latency probe will probe the client DNS server and respond with the result.

The probe servers do not store the results of the probes, they simply send them to other servers over the network. Each piece of probe information has a timestamp of when the probe occurred so the receiving server can determine how stale the probe information is.

Overview

The NetProbes servers are responsible for providing the network with service and latency metrics. The NetProbes servers continuously perform probes and send metrics to DnsServers and LogServers.

Figure 10:
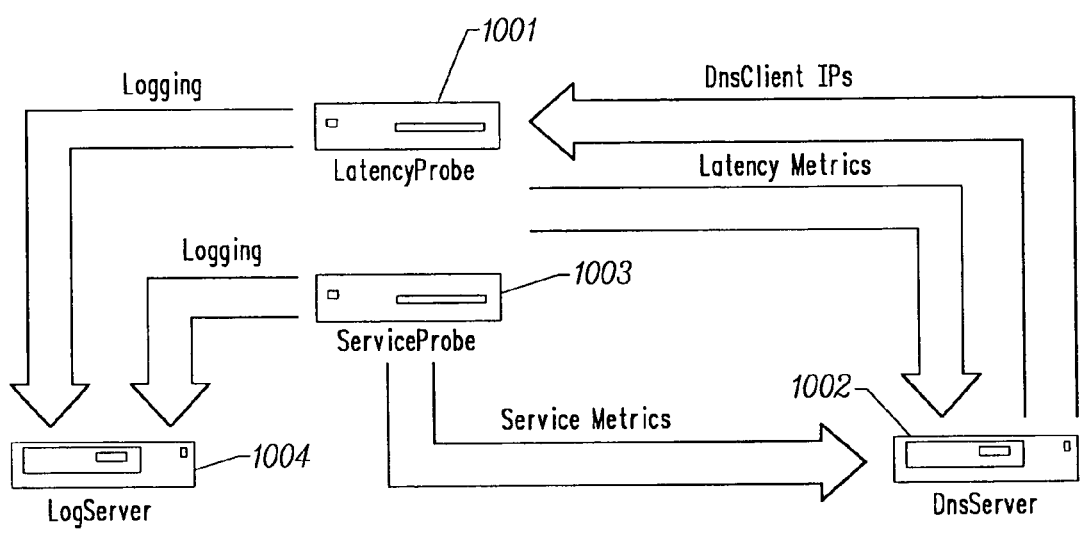
FIG. 10 is a block schematic diagram showing the exchange of data between Latency Probes, Service Probes and other servers within a network according to the invention.

With respect to FIG. 10, there are two different types of NetProbes, a ServiceProbe 1003 and a LatencyProbe 1001. In the Speedera configuration file, each POP is assigned an IP address for a ServiceProbe 1003 and LatencyProbe 1001. They may be different but in most cases, a single machine will perform both service and latency probes.

ServiceProbes

A ServiceProbe 1003 figures out service metric information for servers in the Speedera Network. Each server in the Speedera Network supports one or more services. For example, a Web server machine provides an HTTP service. An FTP server provides an FTP service.

The value of a service metric is dependent on the metric type. For example, an HTTP metric may have a value that represents the machine's response time to an HTTP request in milliseconds.

The CPU/memory load of a machine is available using the LOADP service if the machine is running a LOADP daemon. LOADP is a Speedera protocol described later in this document that returns a value describing a combination of CPU load and swap memory utilization.

In the Speedera configuration file, each DNS name has a set of services associated with it. The ftp.speedera.com DNS name may serve FTP content and therefore have an FTP service associated with it. A www.speedera.com domain name would have the HTTP service associated with it. A speedera.com domain name may have FTP and HTTP services associated with it.

Service metrics are used by DnsServers 1008 to determine the best server to return for a given DNS name. A DnsServer 1008 getting a request for ftp.speedera.com, for example, would know the request is for the FTP service and could compare the FTP service metrics of two servers to determine which is the best to return.

A DnsServer 1008 getting a request for speedera.com may not know which service will be utilized, so it may simply use the LOADP metric to determine which machine has the least loaded CPU and available memory.

LatencyProbes

A LatencyProbe 1001 figures out the latency from its location to other locations on the Internet. DnsServers 1008 need to know the latency from various latency points to determine which point is closest to a user.

When a user hits a Web site, such as www.speedera.com, his machine makes a request to its local DnsClient. This DnsClient, in turn, ends up making a request to a Speedera DnsServer 1008 if the server is authoritative for the www.speedera.com name.

When the Speedera DnsServer 1008 gets a request from a DnsClient, it needs to determine which servers are closest to the client as well as which servers have the best metrics to handle the request.

To determine which servers are closest to the client, the DnsServer 1008 will consult tables that contain latency information from various LatencyProbes. Each server in the Speedera Network is contained in a POP and each POP has a LatencyProbe 1001 assigned to it.

It's the job of the LatencyProbes to perform latency tests to DnsClients. A LatencyProbe 1001 builds up a table of DnsClients to test over time, receiving the list of which DnsClient IP addresses to probe from the DnsServers in the network.

ServiceProbes

ServiceProbes determine service metric information for servers in the Speedera Network. The following types of service probes are available:
HTTP
HTTPS
FTP
Streaming Media (Real, Microsoft, etc.)
Generic SNMP Configuration A ServiceProbe determines which metrics to calculate and what servers to probe by reading the Speedera configuration file. The configuration file contains a LatencyProbe and ServiceProbe entry for each POP.

When the ServiceProbe is configured, it will scan the entire list of POPs in its configuration and examine each ServiceProbe entry to determine if it is the ServiceProbe for that POP. If it is, it will read the list of servers and services contained in the POP and add them to the list of servers to monitor.

Tests

Each service supported by the Speedera Network has a metric test associated with it. HTTP, for example, will have a metric associated with it that is the total time it takes to process a HTTP request. The service test for HTTPS is identical to the service type for HTTP. The only difference being that a secure session is established for the GET request. Secure sessions are not shared; rather a separate secure session with full key exchange is done for each test. For FTP, the test consists of establishing a connection to the FTP port on the server, and making sure that a ready response (220) is obtained from the FTP service. The connection is then closed. Different types of search engines will have different types of tests.

At first glance, it may seem that we could simply use the LOADP metric as the HTTP or FTP metric. However, the LOADP metric doesn't accurately reflect how long a given HTTP request might take to execute on a server. It's best to produce a metric that is based on user-experience rather than trying to infer a metric from other means.

The ServiceProbe performs metric tests at various intervals and adds a line for each test to an internal table. The internal table looks like:

TABLE 1

Server Metric Table Example

| ServerIP | ServiceID | ErrorCode | Metric | TimeStamp |
|---|---|---|---|---|
| 1.2.3.4 | [1] HTTP | [0] NONE | 80 | 103019419 |
| 1.2.3.4 | [0] LOADP | [0] NONE | 340 | 103019421 |
| 1.2.3.4 | [2] FTP | [5] BAD_REQUEST | 65535 | 103019422 |
| 2.3.4.5 | [1] HTTP | [0] NONE | 70 | 103019424 |
| 2.3.4.5 | [0] LOADP | [0] NONE | 330 | 103019425 |

The ServiceID field in the table is the id that identifies the service the metric is for. Each service in the Speedera network has an id specified in the services section of the Speedera configuration file. The ErrorCode field is an internal service-specific error code that can be used to help trace failures. An ErrorCode of 0 is used to signify no error. A metric value of 65535 also generally denotes a verification or timeout failure. The TimeStamp is the time the metric test was performed.

A test can fail either from a verification failure or a timeout. An example of a verification failure might be an HTTP test failing because a response does not contain an expected piece of text. Each test can also time out if there is no response for some period of time. The timeout, in milliseconds, for each test is set in the Speedera configuration file.

SERVP Protocol

At various intervals, the ServiceProbe sends an update to all DnsServers in the Speedera Network using the Speedera SERVP protocol and writes the update to a log file. The update consists of the values of all tests since the last update. The Speedera configuration file contains two values that determine the interval for server metric updates "send interval" and "send size".

The send size is the maximum size of an individual server metric update in bytes. As the probe runs, it accumulates metrics and keeps track of the size of the update packet related to the metrics. If the update packet reaches the size of the send size, the probe sends an update. If the send size is not reached, then the packet is sent when the send interval expires. This causes the update to be sent when it gets too large, by reaching the send size, or when the send interval expires.

Each update is formatted according to the SERVP protocol. All integer values passed in the protocol are passed in network byte order.

The protocol is defined as:

TABLE 2

SERVP Server Metric Update Protocol

| Name | Type | Description |
|---|---|---|
| magic | uint32 | magic number |
| numRows | uint16 | number of rows of data |
| IPAddr | uint32 | row[0] IP address |
| serviceID | uint16 | row[0] service ID |
| errorCode | uint16 | row[0] error code |
| metric | uint16 | row[0] metric |
| timeStamp | uint32 | row[0] time stamp |
| ... | ... | ... |
| timeStamp | uint32 | row[n] time stamp |

LOADP Protocol

To determine the load on a machine, the invention provides a LOADP server. The serviceProbe sends a request and a LOADP server responds with a packet containing the various metrics of the server, e.g. Cpu, memory, snmp, network and scsi metrics. The service probe combines the server metrics to arrive at a load metric which is then sent to the server.

The communication between the client and server is accomplished using the LOADP protocol. All integer values passed in the protocol are passed in network byte order.

A request to a LOADP server follows the following protocol:

TABLE 3

LOADP Request

| Name | Type | Description |
|---|---|---|
| magic | uint32 | magic number |

A response from a LOADP server follows the following protocol:

TABLE 4

LOADP Response

| Name | Type | Description |
|---|---|---|
| magic | uint32 | magic number |
| Error | uint32 | Error code - bit mask; various bits are set to indicate different errors:<br>#define LOADP_OK 0x0<br>#define LOADP_ERR_LOAD 0x1<br>#define LOADP_ERR_MEMINFO 0x2<br>#define LOADP_ERR_NETINFO 0x4<br>#define LOADP_ERR_SNMPINFO 0x8<br>#define LOADP_ERR_SCSIINFO 0x10 |
| Time | uint32 | Timestamp when load was measured. The LOADP server refreshes its metrics at the most once every 10 seconds. |
| CPU/MEM Info | | |
| LoadAverage | uint32 | Avg load in the last minute |
| MemTotal | uint32 | Memory avl on machine (bytes) |
| memUsed | uint32 | Mem used on machine (bytes) |
| swapTotal | uint32 | Total swap space (bytes) |
| swapUsed | uint32 | Used swap space (bytes) |
| Network Info | | |
| inBytes | uint32 | Incoming bytes |
| inPkts | uint32 | Incoming packets |
| inNetErrs | uint32 | Network errors on incoming packets |
| inDrop | uint32 | |

TABLE 4-continued

LOADP Response

| Name | Type | Description |
|---|---|---|
| inFifo | uint32 | Erroneous imcoming packets - dropped, Fifo overflow, fram errors |
| inFrames | uint32 | |
| outBytes | uint32 | Outgoing bytes |
| outPkts | uint32 | Outgoing packets |
| outNetErrs | uint32 | |
| OutDrop | uint32 | Errors in outgoing packets - Network errors, dropped packets, Fifo errors |
| outFifo | uint32 | |
| colls | uint32 | Collisions |
| carrier | uint32 | Carrier loss |
| SnmpInfo | | |
| inRecv | uint32 | Icoming packet statistics |
| inHdrErr | uint32 | |
| inAddrErr | uint32 | |
| inUnknownProto | uint32 | |
| inDiscards | uint32 | |
| inDelivers | uint32 | |
| outReqs | uint32 | Ougoing packet statistics |
| OutDiscards | uint32 | |
| outNoRoutes | uint32 | |
| reasmTimeout | uint32 | Reassembly statistics |
| ReasmReqd | uint32 | |
| ReasmOKs | uint32 | |
| reasmFails | uint32 | |
| fragOKs | uint32 | Fragmentation statistics |
| fragFails | uint32 | |
| fragCreates | uint32 | |
| TCPInfo | | |
| maxConn | uint32 | CP stats - some of these stats are not correctly maintained by the current version of Linux maxConn is always reported as 0. |
| activeOpens | uint32 | |
| passiveOpens | uint32 | PassiveOpens is always 0. |
| failedAttempts | uint32 | |
| estabRsts | uint32 | |
| currEstab | uint32 | |
| inSegs | uint32 | |
| outSegs | uint32 | |
| retransSegs | uint32 | |
| inTcpErrs | uint32 | |
| outRsts | uint32 | |
| UDP Info | | |
| InDGram | uint32 | UDP statistics |
| inNoPort | uint32 | |
| inUdpErrs | uint32 | |
| outDGram | uint32 | |
| SCSI Info | | |
| numTxn | uint32 | SCSI stats |
| numKBytes | uint32 | |
| LoadP Metrics | | |
| numReq | uint32 | Number of requests received by LoadP |
| numRefresh | uint32 | Number of times LoadP refreshed its metrics on the machine |
| errReq | uint32 | Number of err requests |
| errRespSend | uint32 | Number of errors in sending responses |
| ErrLoad | uint32 | |
| errMemInfo | uint32 | |
| errNetInfo | uint32 | Error count for various types of load metrics: load, meminfo, net info, snmp info, scsi info |
| errSnmpInfo | uint32 | |
| errScsiInfo | uint32 | |
| numSigHups | uint32 | Number of SIGHUPS received since last started |

The load value returned by the service probe to Speedera DNS currently is:

load=(10*loadAverage)+(swapSpaceUsed/1000000)

A machine's loadAverage is typically in the range of 1.0–10.0. The swapSpaceUsed is in bytes and the division by 1M turns the right hand side into megabtes of swap space currently used. If the server can't calculate the load value for some reason, it will return a load of 1000.

Logging

When a SERVP server sends an update, the update is also written to a log file. The format of the log output is the same as the update, except:
  there is no magic or numRows (no header)
  the log file is in text file format
  there is a delimiter between columns (pipe symbol or similar)

Referring again to FIG. 10, the Speedera LogServer daemons 1004 perform the job of sending the log file to a central location for processing.

LOADP servers perform no logging of requests or responses.

Latency Probes

LatencyProbes figure out the latency from the POP location to the client's location (normally local DNS server). Each POP in the Speedera Network has a LatencyProbe associated with it. Any number of POPs can share the same LatencyProbe.

In the normal case, when a DnsServer gets a request from a DnsClient, it refers to the metric tables it has built up from each LatencyProbe, finds the DnsGroup entry for the DnsClient, and compares latency values to find the best IP address to return. If it can't find an entry in the tables for the DnsClient, it just returns a "best guess" IP address and sends the IP address of the new DnsClient to all NetProbes in the network at the next update interval.

At a regular interval, the DnsServers in the Speedera Network will send a list of the DnsGroups and DnsClient IP addresses that have recently made requests back to the NetProbe servers. This is used by the LatencyProbe to update the list with new DnsGroups and to update the use counter information for existing DnsGroups.

Configuration

A machine determines if it is a LatencyProbe by looking at the LatencyProbe value for each POP in the Speedera configuration file. If it finds its IP address as a value for a LatencyProbe, it becomes an active LatencyProbe.

The Latency Probe also parses the DNS Zone configuration in the Speedera Configuration file, to determine all the DNS servers to latency metrics needed to be sent.

Tests

Each LatencyProbe maintains a table of latency metrics from its location to a list of DnsGroups. A LatencyProbe will scan its table at a regular interval, looking for entries that are stale and perform probes to update the stale values.

The LatencyProbe maintains an internal table, with one row per Dns Group. The columns in the table are as follows:
  DnsGroup—a group of DnsClient servers (DnsClient IP addresses masked to 255.255.255.0)
  DnsClient[1, 2, 3]—IP addresses for 3 (or less) DnsClient servers in the group
  ProbeType Reverse name lookup/traceroute
  clientindex Index into dnsclient[ ], active client
  ProbeStatus Status of the probe
  TraceRouteInfo All the traceroute realted data
  ProbeTimeStamp: time stamp of when the probe is issued
  LatencyValue—the latency from this location to the Dns-Group
  LatencyValueTimeStamp—the LatencyValue time stamp
  prevLru: prev pointer in LRU list of client DNS records
  nextLru: next pointer in LRU list of client DNS records
  nextInHash: pointer to the next elemnt in the same bucket LatencyProbes perform latency tests by calculating the round trip time for sending a packet to a DnsClient in a given DnsGroup. A latency value from any DnsClient in the group will be considered to be the latency for the whole group.

The probe has a number of tests it can perform to try and determine the round trip time. These include:
  PING
  UDP Reverse Name lookup (request for the DNS name of the DnsClient IP address)
  UDP Packets to high ports numbers LATNPD can be configured to try the different probe types in any order.

Reverse name lookup is a standard DNS query that specifies a client IP address and asks for the client name. When the client responds that gives the round trip time that is used as a latency value. If the reverse name lookup succeeds that latency value is FULL latency measurement. But if the lookup fails LATNPD tries Traceroute.

The UDP packets to high ports is much like traceroute which sends a raw UDP packet with large TTL value (64) to an unreachable port (33434) on the client DNS. This generates an ICMP unreachable port error message to the latency daemon. This response is used as a measure of latency. When the unreachable port error arrives, it suggests that the client is reached, this is considered to be FULL latency measurement.

However, sometimes the trace route message gets lost and no response comes back—so the probe times out. The probe (UDP) is repeated with a TTL value of, four, for example, addressed to the client Dns with the hope that we can reach at least four hops from the source. If this succeeds (LATNP gets a ICMP error message with code TIMEXCEED), repeat this probe process with a TTL value incremented by four, for example, (TTL now is eight) and keep doing this until we get no response. This will indicate the last reachable router and that is used as a proxy for the real client to measure the latency value. This is treated as PARTIAL latency data.

Once FILL latency data is achieved using a client, the probe is sent only to that client even if Speedera DNS sends new clients for the same group.

As mentioned above, LATNPD stores up to three IP addresses for each client DNS group. So if a new client is added to a group that has only PARTIAL latency data available, it designates the new client as the active client and starts the probe process all over, starting with reverse name lookup. This is done so that the new client might give the FULL latency data.

When a new client is added to a client DNS group, LATNPD tries to find a free dnsClient entry for the new client address. If it does not find a free entry it tries to replace a client that got only PARTIAL latency data and is not actively probed.

At an interval controlled by the configuration file, the LatencyProbe sends an update to all DnsServers in the Speedera Network with new DnsGroup latency information. Each DnsServer maintains a latency table associated with each LatencyProbe.

LATNP Protocol

The LatencyProbe uses the Speedera LATNP protocol to receive requests for latency metrics from the DNS servers and to update the DNS servers with the latency information for DNS groups.

The LATNP protocol implementation is supported using two messages. Both messages share a common header. The header is followed by a variable number of request elements for the Latency Request and by a variable number of latency metric elements for the Latency Metric Message.

The Latency Request Message consists of the header followed by a sequence of IP addresses, representing DNS groups for which a metric is desired. The format is as defined below:

TABLE 5

LATNIP Latency Request Message

| Name | Type | Description |
| --- | --- | --- |
| Cookie | uint32 | magic number |
| Version | uint32 | Version |
| Status | uint32 | Status (ignored for requests). |
| NumElem | uint32 | Number of request elements in the request message |
| Ip address | uint32 | Row[0] IP address belonging to the DNS group for which metric is needed |
| IP address | uint32 | row[n] IP address |

The Latency Metric Message consists of the common header followed by a variable number of metric elements. Each metric element consists of the DNS group, latency value, and the timestamp at which latency was measured:

TABLE 6

LATNIP Latency Metric Message

| Name | Type | Description |
| --- | --- | --- |
| Cookie | uint32 | magic number |
| Version | uint32 | Version |
| Status | uint32 | Status for response messages. Following status codes may be returned: LATNP_STATUS_OK LATNP_STATUS_VERSION_MISMATCH LATNP_STATUS_UNSPEC_ERROR (unspecified error) |
| NumElem | uint32 | Number of latency metric elements in the message |
| DnsGroup | uint32 | DnsGroup[0] |
| LatencyValue | uint32 | Latency Value for the Dns group[0] |
| Latency TimeStamp | uint32 | Timestamp at which latency for the Dns group was measured[0] |
| DnsGroup | uint32 | DnsGroup[n] |
| LatencyValue | uint32 | Latency Value for the Dns group[n] |
| Latency TimeStamp | uint32 | Timestamp at which latency for the Dns group was measured[n] |

In both cases, from the DnsClient to the LatencyProbe and from the Latency Probe to the DnsClient, updates are sent at an interval defined in the Speedera configuration file. Each Latency Metric message contains any new latency measurements made during the interval between the previous message and the present message.

Logging

The Latency Probe logs the Statistics data periodically based on the logInterval set in the Speedera config file.

The statistics are aggregated for all the Speedera DNS servers. The layout of the log file is as described here:

TABLE 7

Log file layout

| Name | Type | Description |
| --- | --- | --- |
| TimeStamp | uint32 | Timestamp when the log file is wriiten |
| Iterval | uint32 | Loginterval, time interval btw 2 consequtive logs. |
| Reqs | uint32 | Total # of request packets from all the Speedera DNS servers. |
| Resps | uint32 | Total # of response packets to all the Speedera DNS servers. |
| InvalidReqs | uint32 | Total # of invalid requests from all the DNS servers |
| respErrors | uint32 | Total # of errors in sending responses (communication errors) |
| reqMetrics | uint32 | Total # of metrics in all the requests from Speedera DNS servers. |
| RespMetrics | uint32 | Total # of responses sent in all the responses to Speedera NS servers. |
| RevNameReqs | uint32 | Total no. of reverse name probes done |
| RecNameFails | uint32 | Total no of reverse name probes that failed. |
| TraceRoutes | uint32 | Total no. of traceroute probes issued |
| TraceRouteFails | uint32 | Total no. of traceroute probes that failed (no response at all) |
| TraceRouteFulls | uint32 | Total no. of traceroute probes that reached the client Dns |
| TraceRoutePartials | uint32 | Total no. of traceroute probes that resulted in partial latency values. |
| ProbeSendErrors | uint32 | Total no. of errors in sending probes. |
| Hits | uint32 | Total no. of hits for client IP address |
| MissesNew | uint32 | Total no. of misses when a new client IP addess is looked up in the client Dns Hash table of Latnpd. This results in allocating a new client dns record and starting a probe. |
| MissesStale | uint32 | Total no. of times a client IP address is found in the client Dns Hash table but invalid because since it is stale. This results in sending a new probe and waiting for the response. |
| NonStaleReplaced | uint32 | Total no. of client Dns Records that are not stale but replaced to accommodate new clients. |

LogServer Description

Terminology

POP Server

Any server in a POP that runs a log distributor daemon that sends log files to the log collector daemons on the log servers.

Log Server/Database Server

A server machine that collects log files from the POP servers via the log collector daemons. These log files are then processed and sent to a database server. The database server stores log files generated by log servers as tables. The Netview servers contact the database server to extract statistics like cache hits, billing etc.

Netview Server

A server that runs the user-interface to the Speedera Network via a Web server. The CGI scripts on this server generate requests to the database server on behalf of the clients that are connected to it.

For each unique customer hostname, the server must create a separate log file.

Log files will be rotated on a regular basis (after a certain timeout interval or a certain size threshold). Completed log files will be placed in a well known directory. They will be shipped automatically by the Log Server daemons.

Log files will contain the following fields for each serviced request. These fields will be delimited by a separator such as | or ^. This allows easy insertion in to a database on the receiving end.
Date
Time
Full URL
Request Status (miss, hit . . . )
Request type (?)
Number of bytes Log files will be named according to the naming convention in the Log Server Specification. The name of the file identifies the customer name, the machine name, the machine number, the location, network etc.

Overview

Figure 11:
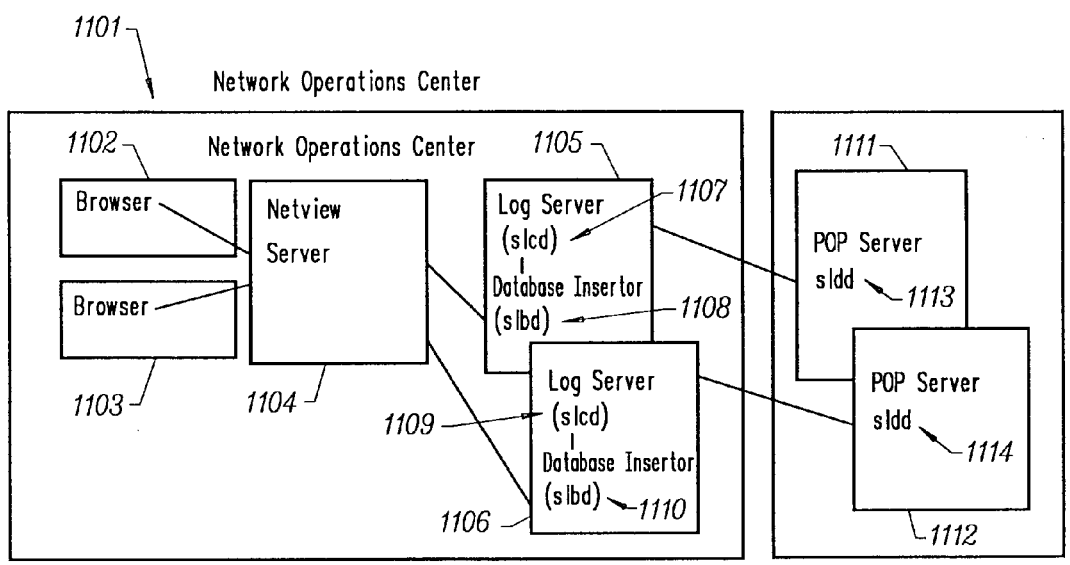
FIG. 11 is a block schematic diagram showing the processes and exchange of data between logging server components according to the invention.

With respect to FIG. 11, the logging subsystem consists of the following daemons that will be used to distribute log files from the POP servers and collect them on the Log servers. In addition to the daemons, there will be tools to dump log data into a database. The database will then be queried by tools on the Netview servers for statistics and billing information etc.

Log Distributor Daemon

The log distributor daemon (sldd) 1113, 1114, sends log files on a POP server 1111, 1112, to a log collector daemon (slcd) 1107, 1109, running on a Log Server 1105, 1106. Each log distributor daemon 1113, 1114, looks in a well known location for files it needs to send. The sldd's 1113, 1114, are multi-threaded and can send multiple log files simultaneously.

Log Collector Daemon

The log collector daemon (slcd) 1107, 1109, collects log files from the log distributor daemons (sldd) 1113, 1114, and places them in directories specified by the date on which the files were received. This daemon is also multi-threaded to handle simultaneous connections from multiple log distributor daemons.

Database Insertor daemon

The database insertor daemon (sldb) 1108, 1110, collects the log files from the directories where the collector daemon (slcd) 1107, 1109, has placed them. It then opens a connection to the database and puts the contents of the log files into tables. The database insertor is multi-threaded and can load multiple log files simultaneously into the database.

Log Distributor Daemon—sldd

A log distributor daemon 1113, 1114, running on a POP server 1111, 1112 does the following:

1. Check a well known directory(that is configurable) for files that need to be sent to the log collector daemons. The file name fully qualifies the type of file it is (one of either NetProbe, DNS or WebCache).
2. Create a new thread for each file that is ready.
3. Each thread determines the Log Server IP to send the file to by querying the DNS server. A query is made to log.speedera.com If multiple IPs are returned, any random IP will be selected. In case, the connection to that IP fails, then all other IPs will be tried in sequence till a connection is established or all IP's have been tried.
4. Compress the log file and send it over.
5. Exit the thread.

Log Collector Daemon—slcd

The log collector daemon 1107, 1109, running on the Log Server 1105, 1106, does the following:

1. Listen for connections from the log distributor daemons (sldd) 1113, 1114, and create a thread for each connection when it is established.
2. Send a ready message indicating available pre-allocated disk space for the file to the sldd 1113, 1114.
3. Receive the file, uncompress it and save it to disk in a well known location (that is configurable) under a numbered sub directory based on the current date.
4. Acknowledge receipt of the file, close the connection and exit the thread.

Database Insertor Daemon—sldb

The database insertor daemon 1108, 1110, running on the Log Server 1105, 1106, does the following:

1. Looks up the latest directory in which the Log Collector daemon 1107, 1109, is placing the log files.
2. When a new log file is found, checks to see if the contents of the file needs to be added to the database. Some files like the syslog files need not be processed.
3. Creates a thread for the file. The thread establishes a connection to the database and inserts the contents of the log file into the database.
4. Exit the thread.
5. The database insertor 1108, 1110, can also be run in standalone mode. In this mode, sldb 1108, 1110, can be configured to look for files starting from a specified sub directory and insert them into the database.

Config File Format

The log daemons do not depend on the configuration file. All the information they need is hard coded or DNS based. This reduces the need to ship config files to all the servers in the network.

Command Line Options

The following command line options are supported by the daemons.

-d<donedir> sets the done directory for the distributor daemon
-r<recvdir> sets the receive directory for the collector daemon and database insertor daemon.
-p<port num> sets the port num for the collector or distributor daemon
-i<ip> sets the default ip for sending log files, for the distributor daemon
-m <no. of threads> maximum number of threads for the daemon
-s run in standalone mode, not as a daemon
-D<debug level> sets the debug option with the level specified
-V prints the version information
-v prints the CV S version information
-h/? prints usage options Apart from the above the database insertor daemon(sldb) also supports the following options:

-S<ddmmhhyy> date dir from which to start inserting files, default is current datedir
-b<subdir num> subdir number inside the startdir to start from, default is 0
-e<end subdir> subdir at which to stop inserting files, default is to keep up with the collector daemon File Naming Conventions Log files are named according to the following naming convention. The _character is used as a token separator.
svc_svcst_server_location_network_ip_date_time(s)_time(us_pid
svc service name (eg. http, dns, sprobe, lprobe, . . . )
svcst service sub type (eg. sec, min, log)

server server name (eg. server-1, server-2, . . . )
location location name (eg. sjc, bos, . . . )
network network name (eg. mci, uunet, . . . )
ip server ip (eg. 10.10.10.12, . . . )
time timein secs since the Epoch
time time in usecs
pid pid (process id)

Message Formats

The message format used to communicate between the log distributor daemon and the log collector daemon is described below. Each message consists of an eight byte fixed header plus a variable size payload:

| Version | Opcode | Info | Resvd |
|---------|--------|------|-------|
| Payload Length | | | |
| Payload Data | | | |
| . . . | | | |

Opcode (1 byte)

The currently defined opcodes are:

| Value | Name |
|-------|------|
| 0 | SLU_INVALID |
| 1 | SLU_FILE_READY |
| 2 | SLU_RECV_READY |
| 3 | SLU_FILE_DATA |
| 4 | SLU_FILE_RECD |
| 5 | SLU_ERROR |

Info (1 byte)

Contains opcode specific information.

Version Number (1 byte)

The logging subsystem protocol version number

Payload Length (4 bytes)

The total length of the payload data in bytes.

Payload

Command specific payload data field.

All the fields are in network byte order.

SLU_INVALID

A place holder to detect zero-filled or malformed messages.

SLU_FILE_READY

The log distributor daemon sends this message to the log collector daemon after it finds a log file and connects. The expected response from the log collector daemon is an SLU_RECV_READY. If there is a problem an SLU_ERROR is returned:

| File Size |
|-----------|
| File Name Length |
| File Name |
| . . . |

SLU_RECV_READY

The log collector daemon returns this message when it is ready to receive data after a new connect.

SLU_FILE_DATA

This message is sent when the log distributor daemon is ready to send a file to the log collector daemon after the collector daemon returns the SLU_RECV_READY Message. The payload contains the compressed file data:

| Compressed File Data |
|----------------------|
| . . . |

SLU_FILE_RECD

This message is sent when the log collector deamon has successfully recd a file.

SLU_ERROR

This message is returned on any non recoverable error. The info field in the message header contains qualifying information on the error condition. The following fields are valid. The connection is reset on any error condition.

Error Handling

Connect failure for distributor daemon:

In case the distributor daemon is not able to establish a connection to any of the Log Servers, the number of active threads is reduced to one. This thread keeps trying to connect to the Log Server after certain time intervals. If a connection is established, the number of threads for the distributor daemon is restored back to the maximum configured value.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method, comprising:
   hosting customer content that can be cached and stored on a plurality of caching servers connected to a network;
   wherein the caching servers respond to client requests for the hosted customer content;
   wherein customer Web servers serve Web pages containing links to a caching domain for hosted customer content;
   wherein the customer Web servers serve dynamic customer content that includes any of: search engines, auctions, or shopping carts;
   wherein a traffic management means directs a client request for hosted customer content for a particular caching domain to an appropriate caching server by resolving a user client domain name resolution request to the appropriate caching server's address and returning the appropriate caching server's address to the client's local domain name server; and
   wherein the hosted customer content is static customer content that includes any of: images, video, text, or software.

2. A method as recited in claim 1, wherein the traffic management means dynamically selects the appropriate caching server from the plurality of caching servers based on current states of caching servers in the plurality of caching servers.

3. A method as recited in claim 2, wherein the current states include information from any combination of: a configuration table, server load information, and network latency information.

4. A system, comprising:
a plurality of caching servers connected to a network;
wherein the caching servers host customer content that can be cached and stored;
wherein the caching servers respond to client requests for the hosted customer content;
wherein customer Web servers serve Web pages containing links to a caching domain for hosted customer content;
wherein the customer Web servers serve dynamic customer content that includes any of: search engines, auctions or shopping carts;
wherein a traffic management means directs a client request for hosted customer content for a particular caching domain to an appropriate caching server by resolving a user client domain name resolution request to the appropriate caching server's address and returning the appropriate caching server's address to the client's local domain name server; and
wherein the hosted customer content is static customer content that includes any of: images, video, text or software.

5. A system as recited in claim 4, wherein the traffic management means dynamically selects the appropriate caching server from the plurality of caching servers based on current states of caching servers in the plurality of caching servers.

6. A system as recited in claim 5, wherein the current states include information from any combination of: a configuration table, server load information, and network latency information.

7. In a distributed network wherein mirrored customer servers serve pages that include links associated with cacheable content or links from which requests for dynamic content can be initiated, and wherein a service provider entity provides a plurality of caching servers that selectively receive and store the cacheable content on behalf of service provider entity customers, the improvement comprising:
providing a traffic manager that is responsive to DNS queries from end user local name servers;
wherein the traffic manager is operative to both (i) direct an end user client request associated with given cacheable content to a preferred caching server for handling by the preferred caching server or to (ii) direct an end user client request associated with given dynamic content to a preferred customer server for handling by the preferred customer server; and
wherein the traffic manager identifies the preferred caching server or the preferred customer server, as the case may be, at the time it receives a DNS query and based on information selected from one of: a configuration file, server load information, network latency information, or a combination thereof.

8. In the distributed network as described in claim 7, wherein the cacheable content is one of: Web content, streaming media, or executable files.

9. In the distributed network as described in claim 7, wherein the dynamic content is generated by one of: a search engine or a database lookup.

10. In the distributed network as described in claim 7, wherein the cacheable content is associated with a service provider domain.

* * * * *